US012602156B2

(12) United States Patent
Gajiwala et al.

(10) Patent No.: US 12,602,156 B2
(45) Date of Patent: Apr. 14, 2026

(54) INFORMATION HANDLING SYSTEM TOUCH DETECTION PALM REST TO SUPPORT TOUCH FUNCTION ROW

(71) Applicant: Dell Products L.P., Round Rock, TX (US)

(72) Inventors: Priyank J. Gajiwala, Austin, TX (US); Nidhi Palan, Pflugerville, TX (US); Keith M. Alfano, Manor, TX (US); Nicholas G. DiLoreto, Georgetown, TX (US); Dewey Yu, Pflugerville, TX (US); Brandon J. Brocklesby, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 153 days.

(21) Appl. No.: 18/428,747

(22) Filed: Jan. 31, 2024

(65) Prior Publication Data

US 2025/0244868 A1    Jul. 31, 2025

(51) Int. Cl.
　　*G06F 3/0482*　　(2013.01)
　　*G06F 3/044*　　(2006.01)
　　*G06F 3/04883*　　(2022.01)

(52) U.S. Cl.
　　CPC .......... *G06F 3/04883* (2013.01); *G06F 3/044* (2013.01); *G06F 3/0482* (2013.01)

(58) Field of Classification Search
　　CPC .............................................. G06F 3/048–05
　　See application file for complete search history.

(56) References Cited

U.S. PATENT DOCUMENTS

| | | | |
|---|---|---|---|
| 7,843,438 B2 * | 11/2010 | Onoda .................... | G06F 1/169 |
| | | | 345/169 |
| 8,674,941 B2 | 3/2014 | Casparian et al. | |
| 9,804,733 B2 | 10/2017 | Walline et al. | |
| 10,088,943 B2 * | 10/2018 | Chen ................... | G06F 3/04883 |
| 10,331,174 B2 | 6/2019 | Dreessen et al. | |
| 10,394,381 B2 * | 8/2019 | Luo ..................... | G06F 3/04886 |
| 11,106,314 B2 | 8/2021 | Krishnakumar et al. | |
| 11,150,751 B2 * | 10/2021 | Kamepalli .......... | G06F 3/04886 |

(Continued)

OTHER PUBLICATIONS support.apple.com, "Use the function keys on MacBook Pro with Touch Bar" published Dec. 20, 2023, available at <<https://support.apple.com/en-us/108316#:~:text=Show%20the%20function%20keys%20Press%20and%20hold,Settings%20(or%20System%20Preferences)%2C%20then%20click%20Keyboard.>>, 2 pages (Year: 2023).*

(Continued)

*Primary Examiner* — Daniel Rodriguez
(74) *Attorney, Agent, or Firm* — Zagorin Cave LLP; Robert W. Holland

(57) ABSTRACT

A portable information handling system palm rest adjacent a mechanical keyboard includes a touch detection surface to accept end user touches as inputs to the information handling system and a force detection sensor to detect pressure associated with the touches. A touch row function defined in an upper strip of the touch detection surface interacts with function key value icons presented at a main display to accept function key row inputs in the place of mechanical function keys of the keyboard. Logic executing on a processing resource compares touch areas with associated pressures to differentiate intentional inputs from unintentional inputs, such as a palm resting on the palm rest.

20 Claims, 22 Drawing Sheets

(56)	References Cited

U.S. PATENT DOCUMENTS

| | | | |
|---|---|---|---|
| 11,237,598 B2 | 2/2022 | Seibert et al. | |
| 2006/0044259 A1* | 3/2006 | Hotelling .............. | G06F 1/1684 |
| | | | 345/156 |
| 2009/0033628 A1* | 2/2009 | Srivastava ............ | G06F 3/0238 |
| | | | 345/169 |
| 2016/0299628 A1* | 10/2016 | Ribeiro ................. | G06F 3/0418 |
| 2016/0349989 A1* | 12/2016 | Yu ............................ | G06F 3/041 |
| 2017/0010771 A1* | 1/2017 | Bernstein ............ | G06F 3/04817 |
| 2017/0300166 A1* | 10/2017 | Rosenberg ............ | G06F 3/0443 |
| 2018/0032203 A1* | 2/2018 | Sepulveda ............ | G06F 1/1647 |
| 2018/0074637 A1* | 3/2018 | Rosenberg .......... | G06F 3/04166 |
| 2019/0361543 A1* | 11/2019 | Zhang ................... | G06F 1/1684 |
| 2020/0004337 A1* | 1/2020 | Hendren .............. | G06F 1/1616 |
| 2020/0349895 A1* | 11/2020 | Files ........................ | G09G 3/20 |
| 2020/0349903 A1* | 11/2020 | Pelissier .............. | G06F 3/0393 |
| 2021/0055857 A1* | 2/2021 | Seymour .............. | G06F 3/0238 |
| 2022/0066614 A1* | 3/2022 | Shirley ................. | G06F 3/0446 |

OTHER PUBLICATIONS

Harding, S., "Review: Dell's XPS 13 Plus pulls high performance from a frustrating design," downloaded from https://arstechnica.com/gadgets/2022/09/review-dells-xps-13-plus-pulls-high-performance-from-a-frustrating-design/ on Jan. 25, 2024, 6 pages.
Macos User Guide, "Use the Touch Bar on Mac," downloaded from https://support.apple.com/guide/mac-help/use-the-touch-bar-mchlbfd5b039/mac on Jan. 25, 2024, 4 pages.
The Verge, "Dell XPS 13 Plus hands-on: is that . . . a touch bar?," downloaded from https://www.theverge.com/2022/1/4/22865547/dell-xps-13-plus-2022-hands-on-new-design-features on Jan. 25, 2024, 8 pages.

* cited by examiner

INFORMATION
HANDLING SYSTEM
10

HOUSING
LID PORTION
16

DISPLAY
20

KEYBOARD
38

COVER
PORTION
36

18
HINGE

40
PALM REST 24
26
28
30
22
MOTHERBOARD
32
34

CPU
RAM
SSD
GPU
EC
WNIC

14
MAIN
PORTION

12
HOUSING

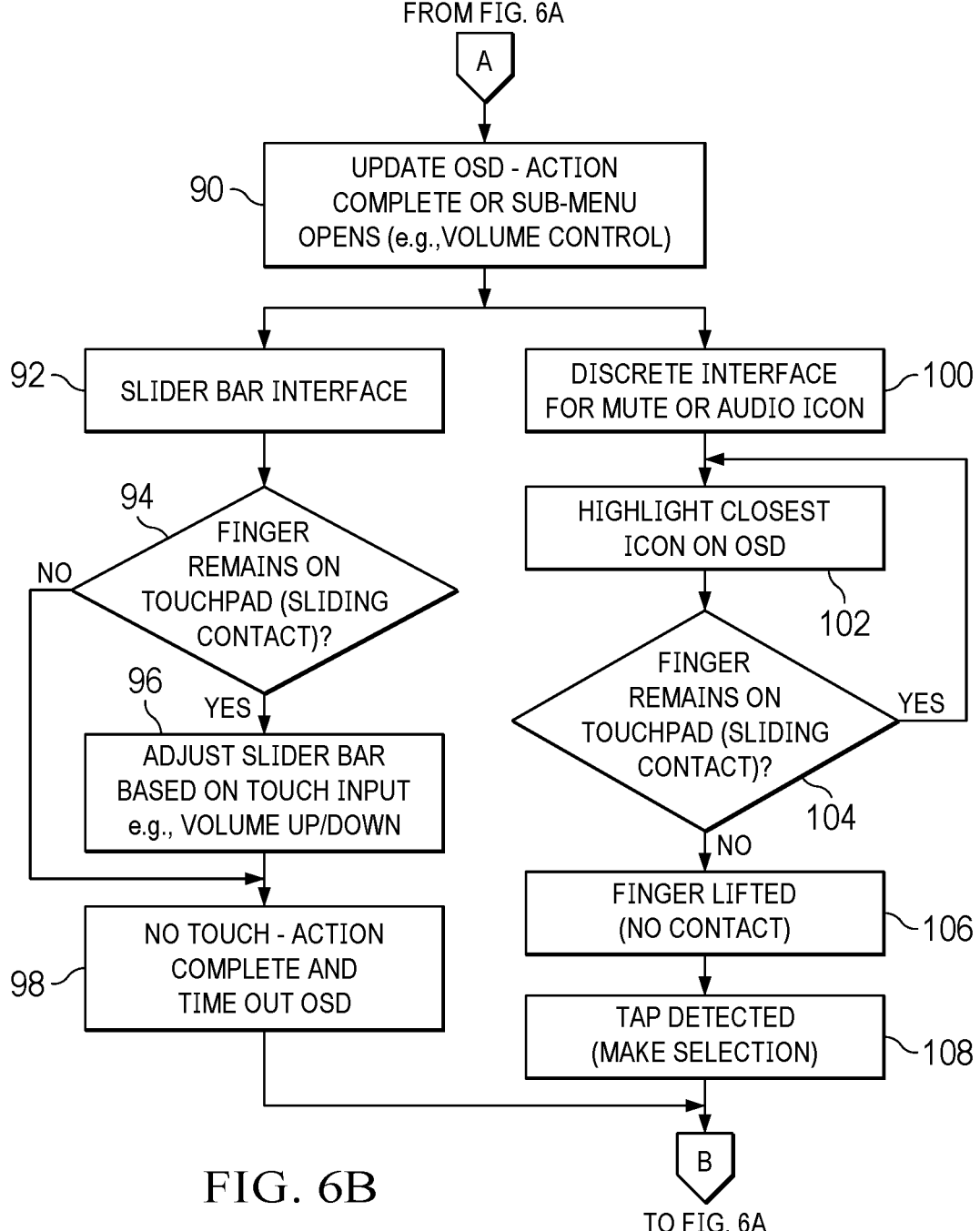

FROM FIG. 6A

A

90 — UPDATE OSD - ACTION COMPLETE OR SUB-MENU OPENS (e.g.,VOLUME CONTROL)

92 — SLIDER BAR INTERFACE

DISCRETE INTERFACE FOR MUTE OR AUDIO ICON — 100

94 — FINGER REMAINS ON TOUCHPAD (SLIDING CONTACT)?

NO

YES

96 — ADJUST SLIDER BAR BASED ON TOUCH INPUT e.g., VOLUME UP/DOWN

HIGHLIGHT CLOSEST ICON ON OSD — 102

FINGER REMAINS ON TOUCHPAD (SLIDING CONTACT)? — 104

YES

NO

98 — NO TOUCH - ACTION COMPLETE AND TIME OUT OSD

FINGER LIFTED (NO CONTACT) — 106

TAP DETECTED (MAKE SELECTION) — 108

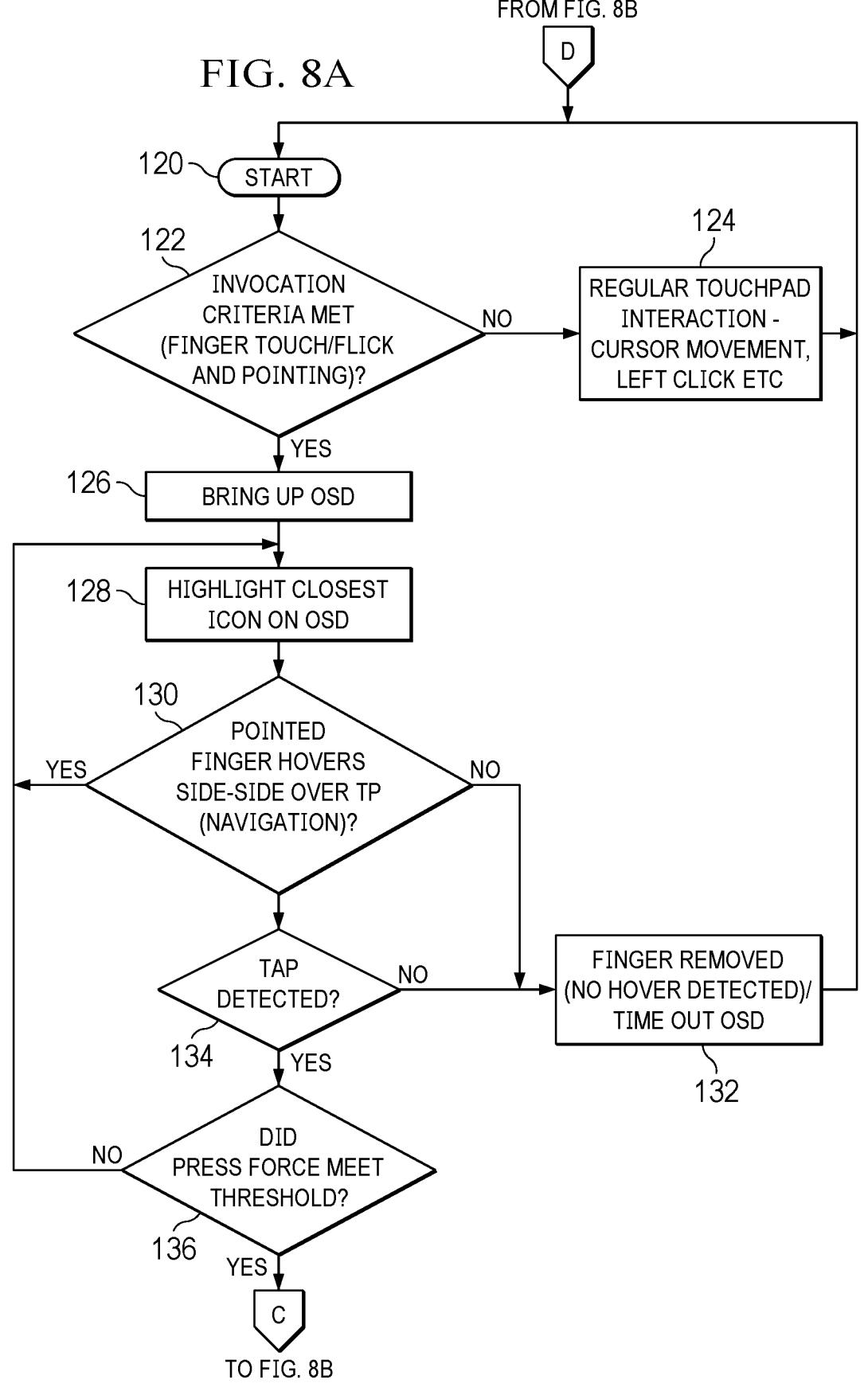

FROM FIG. 8B

D

120 START

122 INVOCATION CRITERIA MET (FINGER TOUCH/FLICK AND POINTING)?

NO → 124 REGULAR TOUCHPAD INTERACTION - CURSOR MOVEMENT, LEFT CLICK ETC

YES

126 BRING UP OSD

128 HIGHLIGHT CLOSEST ICON ON OSD

130 POINTED FINGER HOVERS SIDE-SIDE OVER TP (NAVIGATION)?

YES

NO

TAP DETECTED?

NO

134

YES

132 FINGER REMOVED (NO HOVER DETECTED)/ TIME OUT OSD

DID PRESS FORCE MEET THRESHOLD?

NO

136

YES

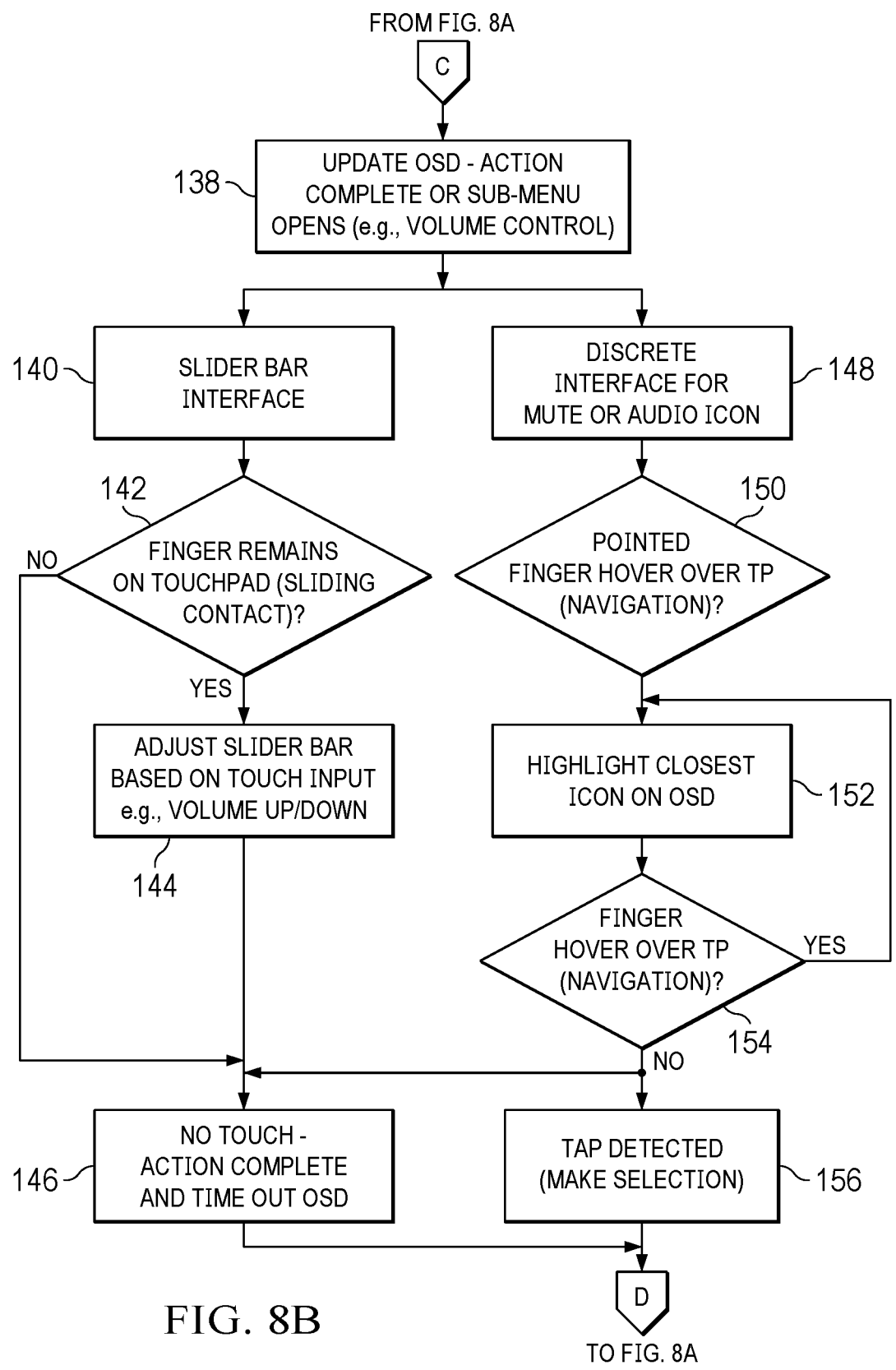

FROM FIG. 8A

C

138 — UPDATE OSD - ACTION COMPLETE OR SUB-MENU OPENS (e.g., VOLUME CONTROL)

140 — SLIDER BAR INTERFACE

148 — DISCRETE INTERFACE FOR MUTE OR AUDIO ICON

142 — FINGER REMAINS ON TOUCHPAD (SLIDING CONTACT)?     NO

150 — POINTED FINGER HOVER OVER TP (NAVIGATION)?

YES

ADJUST SLIDER BAR BASED ON TOUCH INPUT e.g., VOLUME UP/DOWN
144

HIGHLIGHT CLOSEST ICON ON OSD — 152

FINGER HOVER OVER TP (NAVIGATION)?     YES
154     NO

146 — NO TOUCH - ACTION COMPLETE AND TIME OUT OSD

TAP DETECTED (MAKE SELECTION) — 156

E-INK APPLICATION AREA

240

252

· NUM-KEYS / ENGINEER MODE SWITCH
· FINGER SIGNATURE
· NOTIFICATION
· QUICK APPS ICON

PIANO KEYBOARD

254

INFORMATION HANDLING SYSTEM TOUCH DETECTION PALM REST TO SUPPORT TOUCH FUNCTION ROW

BACKGROUND OF THE INVENTION

Field of the Invention

The present invention relates in general to the field of portable information handling systems, and more particularly to an information handling system touch detection palm rest to support touch function row.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

One advantage of convertible information handling systems is that they include mechanical keys in the keyboard with vertical travel that provides positive feedback to end users when a key input is made by a key press. Mechanical keys tend to be more user friendly in that end users can type at full speeds similar to when using peripheral keyboards, in contrast with virtual keyboards that are presented at a display as a visual image and that detect inputs with touches to a touch detection screen, such as with a capacitive touch sensor. One technique to improve inputs with virtual keys is to provide localized haptic feedback when an input is performed, such as by a piezoelectric or other vibration source below the key value on the display. While somewhat helpful, the feedback is generally less useful than that of vertical travel of a mechanical key and sometimes difficult to isolate to a particular location at a keyboard where a key is pressed. A disadvantage of convertible information handling system keyboards is that the size of the keys and the amount of vertical travel are typically reduced due to the small size of the portable housing. This can mean hunting and pecking at keys to perform inputs, particularly with unfamiliar key input values, such as numbers in a number row of a conventional QWERTY keyboard or functions in a function row at the upper top row of keys in a typical information handling system keyboard.

The function row of keys generally has an escape at the far left and then function keys F1 through F12. Some arrangements will have insert and delete keys to the far right, others in smaller sized housings might include fewer function keys, such as F1 through F9. In addition, each function key also can have a toggle or submenu secondary function that is commanded when the function is not selected. For instance, display, keyboard backlight, speaker, microphone and audiovisual controls may be included on function keys. A speaker toggle key might mute and unmute the speaker when the key is pressed. A difficulty with function key interactions is that an end user typically has to hunt and peck for the correct function key by looking at the keyboard and reading the key value from the function keys of the function key row. This tends to introduce inefficiency due to the time needed to find the right key and also due to the attention of the end user being drawn away from displayed visual images, which breaks down user workflow. Often manufacturers will assign input values to keyboards for the function keys so that memorized workflows might fail as an end user moves between different keyboard configurations with different assigned key values.

One difficulty that can arise with mechanical keyboards integrated into a portable information handling system housing is that the upper surface typically includes a palm rest that an end user rests her palms on while typing. The palm rest takes up a good deal of space at the upper surface of the main housing portion. Often a touchpad device is included in the palm rest to act as a mouse pointing device. When a touchpad is present, the system generally has to analyze the touches at the touchpad to selectively reject touches that are not intended as touch inputs. As an example, the touchpad compares touch areas against expected touches that are not intended as inputs, such as a palm resting on the touchpad, and then rejects the touches. When the touch rejection is not properly tuned, intended inputs can be ignored and touches that are not intended as inputs can cause unexpected inputs at the system.

SUMMARY OF THE INVENTION

Therefore, a need has arisen for a system and method which filters touches at a palm rest touch rejection surface to reject those not intended as inputs with improved speed, space to perform inputs and accuracy.

A further need exists for a system and method that supports a touch function row interaction with touches at a palm rest in place of mechanical keys in the keyboard at a function key row.

In accordance with the present invention, a system and method are provided which substantially reduce the disadvantages and problems associated with previous methods and systems to manage inputs at an information handling system. A palm rest adjacent a mechanical keyboard detects touch inputs and rejects touches not intended as inputs by comparing touch areas and touch forces against expected touch areas and touch forces for intended and unintended touch inputs. In one example embodiment, a function row in a keyboard is managed with touches at a touch detection surface of the palm rest that interacts with a touch function row on-screen-display user interface presented at a main display. In an alternative embodiment, a display under the palm rest touch detection surface presents the touch function row key input icons as well as other interfaces to support operations at the main display. This allows end users to access function key values at the palm rest touch surface that are presented at the on-screen-display without reach over the mechanical keyboard. An end user performs inputs with smaller, quicker and more efficient movements while view is focused on the display.

More specifically, a portable information handling system processes information with processing components disposed in a housing main portion, such as a processor that executes instruction to process information in cooperation with a memory that stores the instructions and information. A housing cover portion couples to the main portion to support a mechanical keyboard that accepts key presses as inputs and a palm rest that includes a touch detection surface and a display to accept touch inputs. The palm rest touch detection surface includes a force detection sensor that detects the force applied at touched locations. Touch and force detection is enhanced by a piezo based sensing so that a large palm rest touch detection surface distinguishes for an end user the touch input locations. Logic executing on processing resources of the touch detection surface and/or the force detection sensor compares touch areas against touch force to distinguish touches that are intended as inputs from touches that are not intended as inputs. For example, palm rejection is performed by detecting the force applied by a palm in addition to capacitive touch sensing so that a light palm press can be more positively distinguished from a heavy thumb touch intended at a click. The palm rest touch detection surface supports interactions with function key icon values presented at a main display through a touch function row at the upper part of the palm rest. In addition, with an integrated E-ink or similar display, the touch detection surface supports a variety of other interfaces, such as gaming and utility interfaces and a scale to weigh objects using the force detection sensor.

The present invention provides a number of important technical advantages. One example of an important technical advantage is that an end user interacts with a touch detection surface at a palm rest of an information handling system with greater confidence of accurate inputs and rejection of touches not intended as inputs. In particular, comparing touch area and touch force at an end user touch location provides improved confidence of rejection of palm touches and acceptance of thumb inputs. The improved confidence aids in the use of the touch detection surface for touch function row inputs where a palm may rest with varied weight and an end user may interact through proximity as opposed to touch at the touch function row touch areas. A display included under the palm rest touch detection surface further enhances end user touch input interactions by offering visual images to guide inputs. Another advantage is that a touchpad is provided with a full width of the palm rest. A touch detection surface at the full palm rest area maximizes the surface area available for end users to perform inputs for an improved end user experience. For example, scrolling across long displays is improved with the greater width of the touch detection surface, such as with peripheral displays that have a curved or extended width or across multiple peripheral display interfaced in series. In such a situation, an end user can complete an input without lifting their finger to complete an interaction.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 6A and 6B depict a flow diagram of a process for interacting with a palm rest touch detection surface to manage touch inputs as function key inputs;

FIGS. 8A and 8B depict a flow diagram of a process for detecting touch function row inputs at a palm rest using proximity detection;

FIG. 15 depicts another example of a palm rest display having utilities that support end user productivity applications;

DETAILED DESCRIPTION

A portable information handling system palm rest includes a touch detection surface to detect touch inputs and force detection sensor that detects the pressure applied touches, with a comparison of touch areas and touch forces used to distinguish intentional inputs from unintentional touches, such as a palm resting on the touch detection surface. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
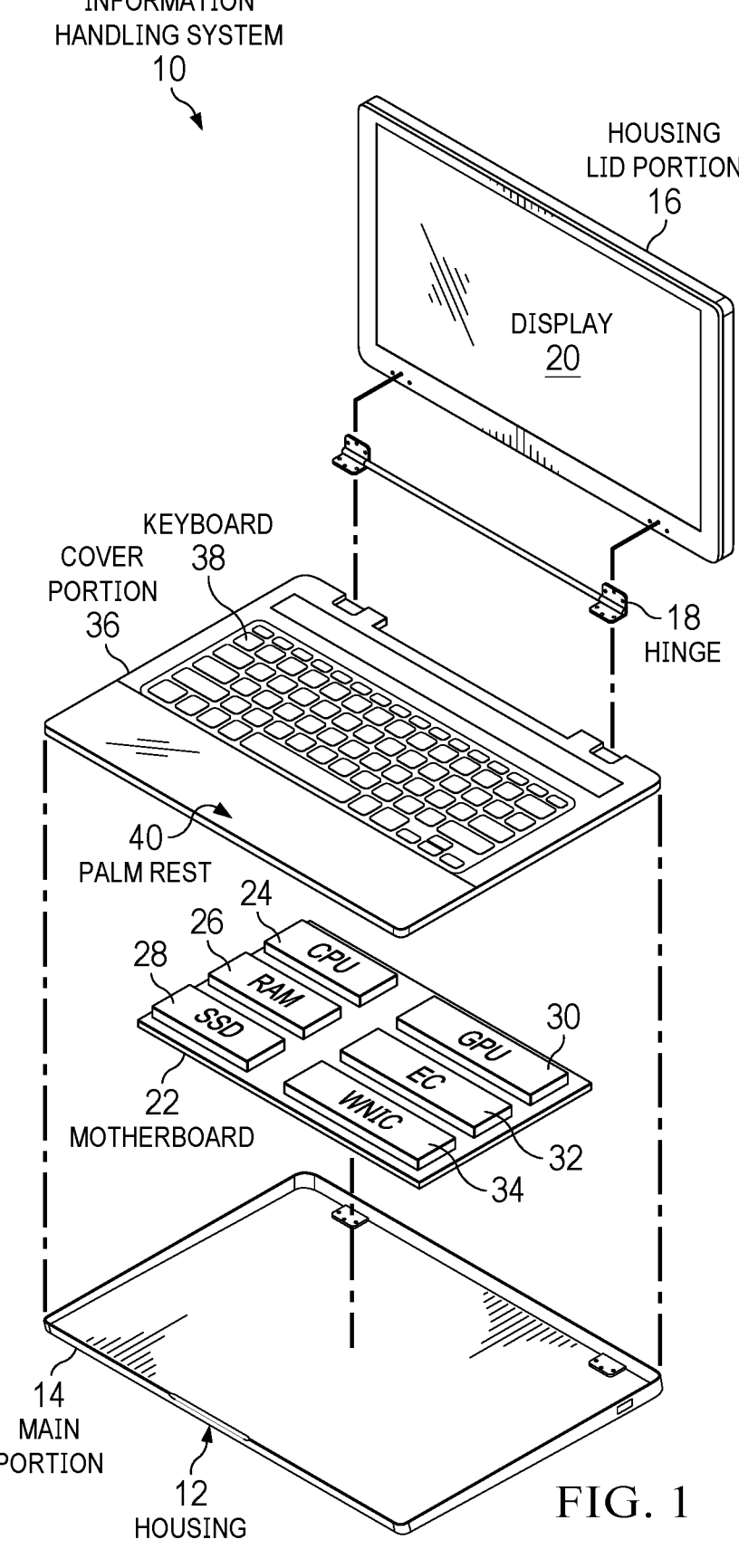
FIG. 1 depicts an upper perspective exploded view of a portable information handling system 10 having a palm rest that distinguishes unintended inputs by comparing touch area and touch force.

Referring now to FIG. 1, an upper perspective exploded view depicts a portable information handling system 10 having a palm rest that distinguishes unintended inputs by comparing touch area and touch force. Portable information handling system 10 is built in a portable housing 12 having a main portion 14 rotationally coupled to a lid portion 16 by a hinge 18. A main display 20, such as a liquid crystal display (LCD) panel or organic light emitting diode (OLED) film, couples in lid portion 16 and presents information as visual images. A motherboard 22 couples in main portion 14 and interfaces processing components that cooperate to process information. For example, a central processing unit (CPU) 24 executes instructions to process information in cooperation with a random access memory (RAM) 26 that stores the instructions and information. A solid state drive (SSD) 28 provides persistent storage of instructions and information, such as an operating system and applications that are retrieved at power up to RAM 26 for execution on CPU 24. An embedded controller 32 manages operating conditions of the system, such as application of power, maintaining thermal constraints and interactions with peripheral devices. A graphics processing unit (GPU) 30 processes information to generate visual images presented at display 20. A wireless network interface controller (WNIC) 34 provides network communications with external networks and peripheral devices, such as through WIFI and BLUETOOTH.

A housing cover portion 36 couples to main portion 14 to cover an protect the processing components disposed in housing main portion 14. Cover portion 36 supports a keyboard 38 at an upper surface that has mechanical keys to accept end user inputs as key presses at keys having vertical travel. A palm rest 40 couples adjacent to keyboard 38 to provide a resting area for an end user's palms when the end user types at keyboard 38. Palm rest 40 includes a touch detection surface, such as a capacitive touch detection sensor, to accept end user touch inputs. For example, an end user can control a cursor at display 20 with touches at palm rest 40 or perform a variety of other tasks as are delineated below in greater detail. Palm rest 40 also includes a force detection sensor that detects the amount of pressure placed on palm rest 40. Logic executing on a processing resource within palm rest 40 and on CPU 24, such as in cooperation with an operating system, analyzes touches at palm rest 40 and pressures detected by the force detection sensor to distinguish which touches are intended as inputs to the information handling system and which touches are incidental and not intended as inputs. The nonintentional touches are discarded or rejected as inputs so that end users are provided with a more accurate and easy to use capacitive touch input area. In particular, locating and confirmation palm touches at palm rest 40 with both touch area and force sensing provides an added data point to more effectively handle the decision of whether to filter out touches as inputs, thus allowing an end user to more actively and precisely interact with the palm rest as a touch input.

Figure 2:
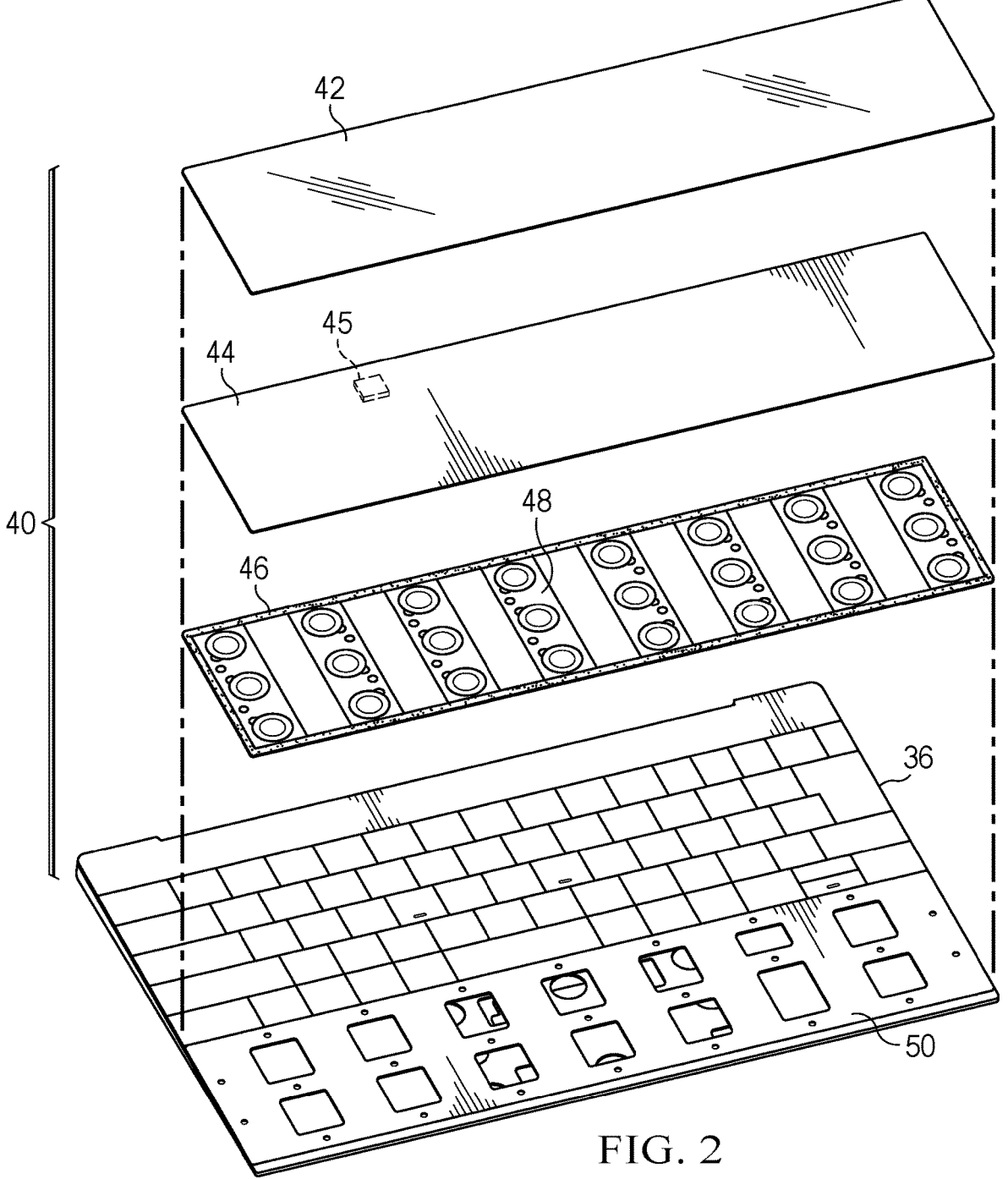
FIG. 2 depicts an upper perspective exploded view of the palm rest having touch and force sensing adjacent an integrated mechanical keyboard.

Referring now to FIG. 2, an upper perspective exploded view depicts palm rest 40 having touch and force sensing adjacent an integrated mechanical keyboard. Housing cover portion 36 has an integrated keyboard coupled to an upper surface with mechanical keys that accept inputs with vertical movement in response to an end user press. Palm rest 40 couples to housing cover portion 36 adjacent the keyboard to have an upper glass cover 42 over a printed circuit board (PCB) 44 that includes one or more processing resources 45 to manage touch detection, force detection and haptic feedback generation, such as a microcontroller unit (MCU) that integrates flash memory or other non-transient memory to store instructions or information. In the example embodiment, glass cover 42 provides a touch detection surface with integrated wirelines that interface with PCB 44. In alternative embodiments, the touch detection surface may be supported directly from PCB 44 or may be included with the force detection sensor. Touch detection is performed with capacitive touch sensing that can include proximity sensing when an end user finger approaches but does not touch the touch detection surface. A periphery adhesive 46 couples flexible printed circuits (FPCs) 48 to the lower surface of PCB 44 that includes force detection sensors and piezoelectric haptic feedback devices. The cover glass, PCB and FPC couple to a lower support bracket 50 included at housing cover portion 36. When a touch is made at cover glass 42, capacitive touch detection determines a location and area of the touch based upon capacitive coupling of an electric field and force detection sensing determines an amount of force or pressure associated with the touch location. In the example embodiment, force sensing is performed by deflection of the piezoelectric devices; however, in alternative embodiments force sensing may be performed by other methods.

Figure 3:
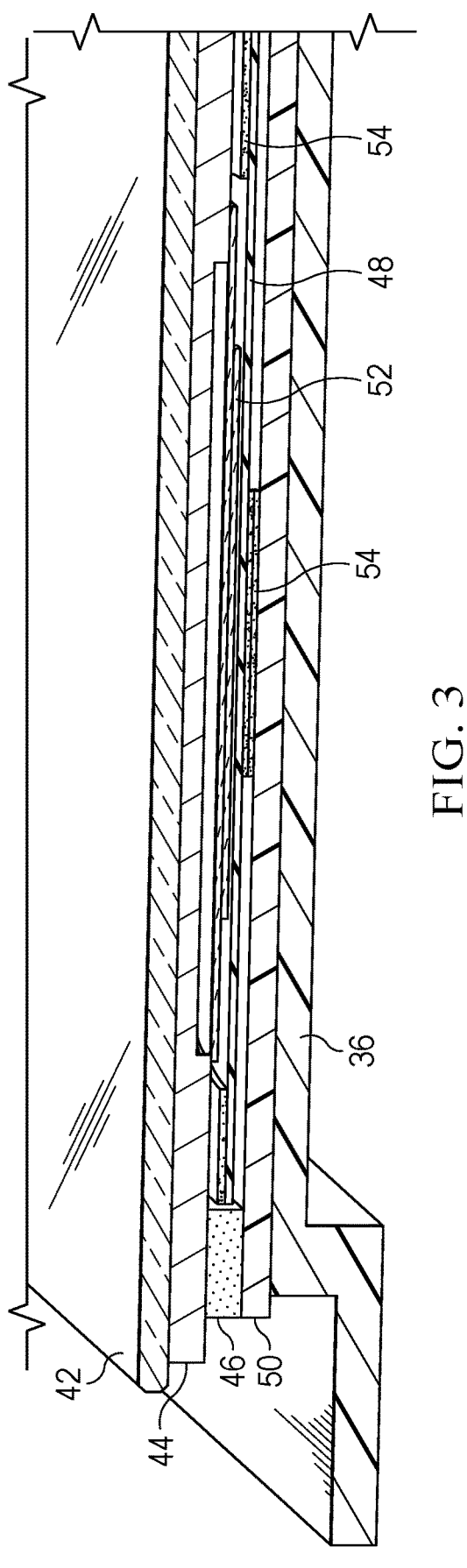
FIG. 3 depicts a side sectional view of a vertical stack of the palm rest configured to detect touch and force inputs.

Referring now to FIG. 3, a side sectional view depicts a vertical stack of palm rest 40 to detect touch and force inputs. Touches at cover glass 44 are detected with capacitive touch detection in coordination with PCB 44 and its processing resource. Deflection of the cover glass and PCB are detected as force with force detection sensors of FPC 48 coupled by adhesive 54 and hot bar soldering to PCB 44. A periphery adhesive 46 couples the palm rest 40 assembly to housing cover portion 36 over support bracket 50 so that downward presses meet sufficient resistance to record touch and force sensing. As a result, the Z-stack is optimized to minimize impact on overall system height.

Figure 4:
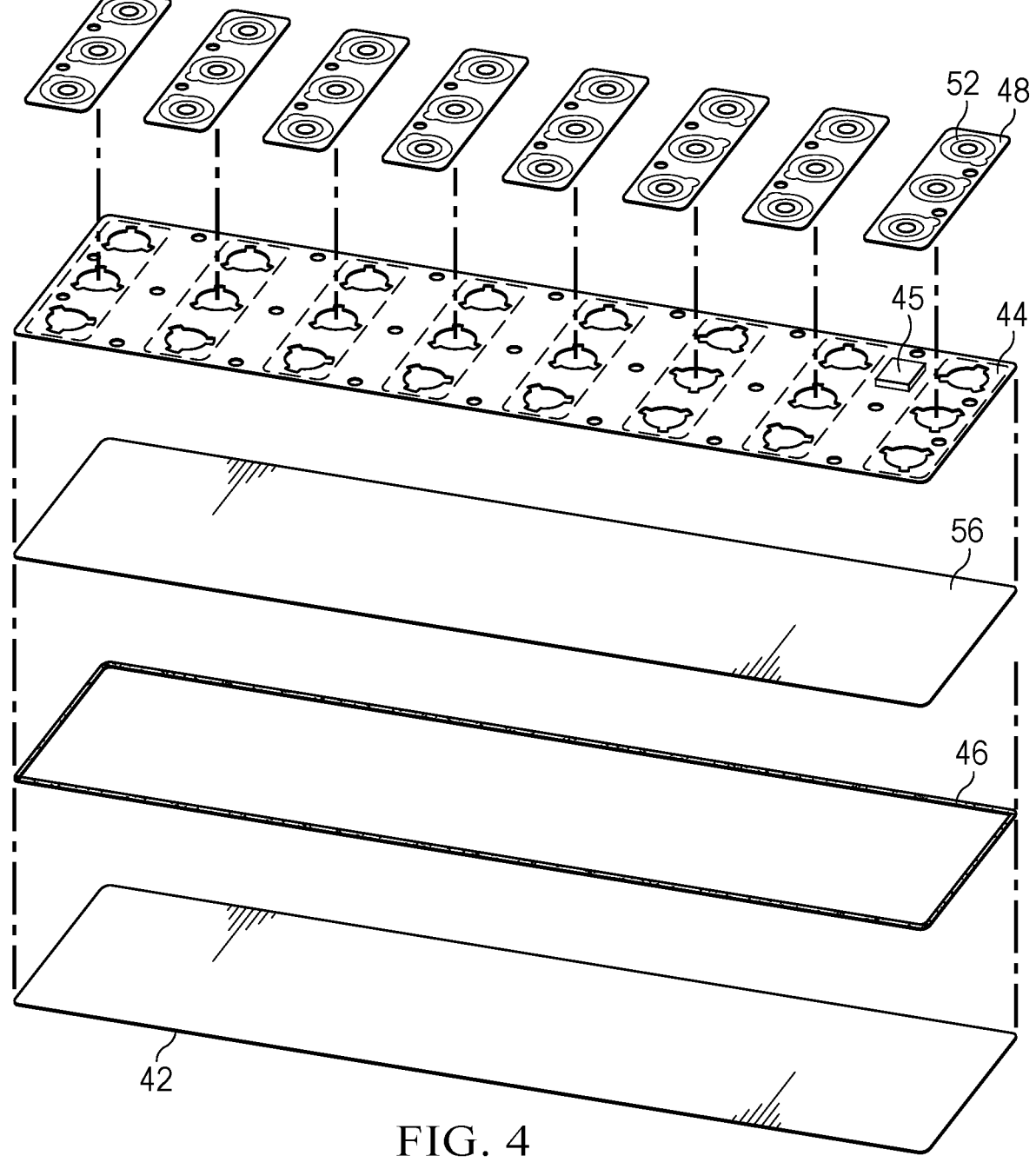
FIG. 4 depicts a lower perspective exploded view of a palm rest 40 having touch and force sensing with an integrated display.

Referring now to FIG. 4, a lower perspective exploded view depicts a palm rest 40 having touch and force sensing with an integrated display 56. In the example embodiment, a thin OLED display film generates visual images, although alternative embodiments may use other types of displays, such as E-Ink displays. As is described above, cover glass 42 accepts touch inputs in cooperation with PCB 44 and managed by an MCU or other processing resource coupled to PCB 44. Forces associated with touches are detected by FPCs 48 that include force detection sensors. Haptic feedback is provided by piezoelectric haptic devices 52 that couple to FPC 48 that generate localized vibrations under the management of the PCB 44 processing resource. E-ink display 56 interfaces with the PCB processing resource to present information as visual images viewable through cover glass 42, as described in greater detail below. Although the example embodiment depicts an E-ink display, alternative embodiments may use other types of displays, such as OLED films.

Figure 5:
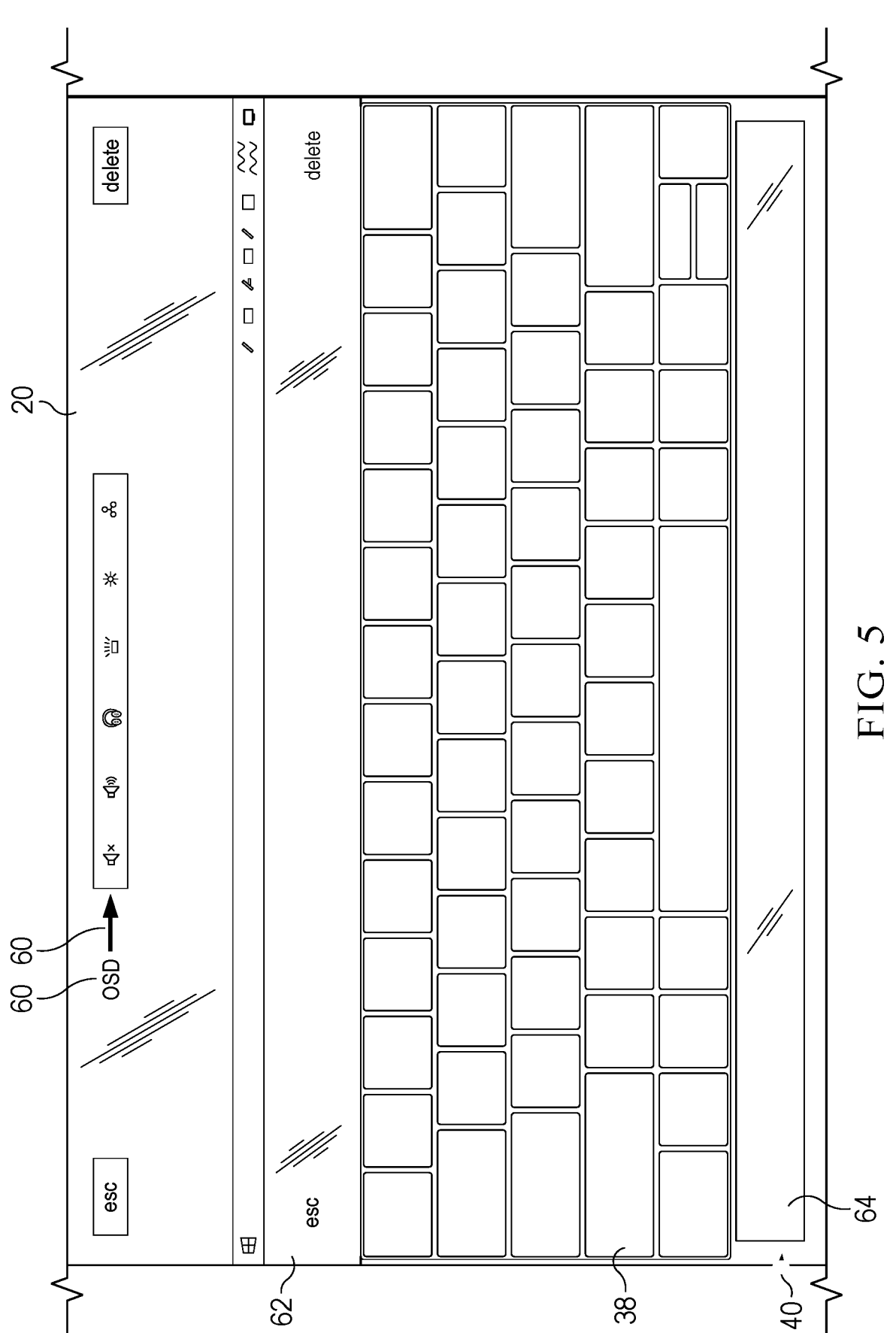
FIG. 5 depicts a top view of the information handling system having touch inputs at a palm rest to perform function key inputs for a touch function row supported by a touch function row on-screen-display user interface.

Referring now to FIG. 5, a top view of information handling system 10 depicts an example embodiment having touch inputs at a palm rest 40 to perform function key inputs for touch function row 62 supported by a touch function row on-screen-display user interface 60. Keyboard 38 of information handling system replaces mechanical keys in a function row with a capacitive touch detection surface that supports function key value inputs with touch function on-screen-display user interface 60, as is described in greater detail in "Information Handling System Capacitive Touch Function Row with On-Screen-Display User Interface," U.S. application Ser. No. 18/422,271, by Baluch et al., filed on Jan. 25, 2024 which is incorporated herein as if fully set forth. When an end user desires to input a function key value, such as escape and F1-F12, the end user touches touch function row 62 to bring up a display of the function key values at on-screen-display user interface 60. A secondary touch row function 64 at palm rest 40 provides an alternative interface for performing function key inputs to the touch function row 62 located between keyboard 38 and primary display 20. Once the on-screen-display user interface is invoked and presented on the main display, the end user can place a finger at any location of the palm rest touch detection surface and move horizontally to navigate the on-screen-display user interface. Advantageously, touch inputs at palm rest 40 to perform function key input selections avoid reaching across the keyboard keys for a more comfortable interaction than at touch function row 62 while presentation at touch function on-screen-display user interface of the function key values simplifies end user interactions without breaking the work flow by diverting the end user gaze from display 20. Alternatively, function key values may be presented by a display under palm rest 40. In one alternative embodiment, the palm rest touch surface and on-screen-display user interface replace the touch function row and the function key row completely. The escape and F1-F12 keys may be integrated with other keyboard keys so that the function row of keys is eliminated. In such a configuration, an end user interacts with the palm rest touch detection surface to initiate media based functions. For instance, a multi-finger swipe opens and closes the on-screen-display user interface to access media functions like speaker volume or video play. Elimination of the mechanical function key row improves the system thermal rejection to increase system performance.

In one example embodiment, an end user invokes the function key inputs by a gesture at palm rest 40, such as a flick, slide or tap. Once invoked, touches at the secondary touch function row 64 are reported as function key inputs and the function key values are presented at display 20, such as with the function associated with an end user touch location at palm rest 40 presented in a highlighted manner. The manner of selecting and presenting palm rest touches as function key inputs may be customized by an end user to adjust size, location, type of icons and supported functions shown at the touch function on-screen-display user interface and the palm rest integrated display. The presentation of the touch function on-screen-display user interface may be managed through the operating system and GPU or as an overlay to the operating system presentation, such as by the palm rest processing resource, a touch function row processing resource or a display scalar. In one example embodiment, an end user initiates the secondary touch function row 62 by sliding a finger in the upper third of palm rest 40, which initiates the touch function on-screen-display user interface presentation at display 20 with a touch function highlighted that corresponds to the location of the sliding touch. Localized haptic feedback at the palm rest indicates activation of the display and interactions with the user interface. A lift and tap or a press with additional force sensed by the force detection sensor selects the highlighted function. The input can toggle between values, such as mute and unmute a speaker or microphone, or can open a sub-menu for the selected function. A gesture, such as a flick or slide, can move the touch function key icons from presentation at the display, the touch function row and/or the palm rest. In addition, the inputs may be performed with a hover interaction at palm rest 40 that indicates a selection with a tap, as described below with respect to FIG. 7.

Figure 6A:
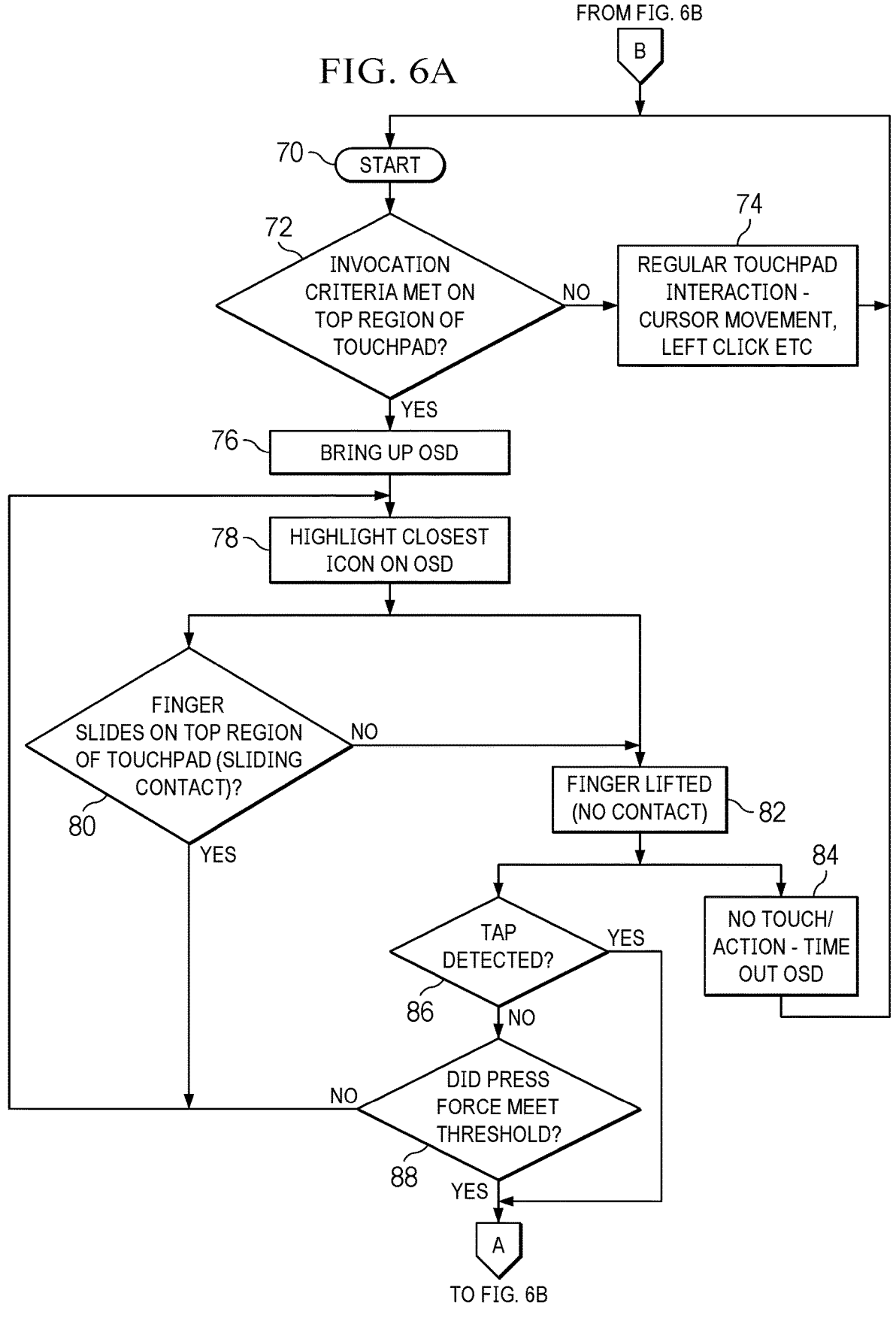

Referring now to FIGS. 6A and 6B, a flow diagram depicts a process for interacting with a palm rest touch detection surface to manage touch inputs as function key inputs. The process starts at step 70, such as at a detection of a touch input at a palm rest, and at step 72 determines whether the touch is an invocation of the touch function row, such as with a sliding finger motion in the upper third part of the palm rest. If not, the process continues to step 74 to determine the touch input value as other than invocation of the touch function row, such as cursor movement, button click or other interaction. If at step 72 the touch input at the palm rest commands the touch function row, the process continues to step 76 to present the touch function on-screen-display user interface at the system primary display. In alternative embodiments, the touch function on-screen-display user interface may also present at the touch function row and/or a display included in the palm rest. The process then continues to step 78 to highlight the closest function key icon to the touch location of the end user, such as by showing the function key icon associated with the touch location as having a larger size, different shading and/or different transparency. At step 80, a determination is made of whether the touch location has changed with a sliding contact and, if so, the process returns to step 78 to change the highlighted function icon to that of the touch location. At step 82, when a finger lift is detected from the sliding position, a timer starts to determine if the touch has ended or if a tap indicates a function icon key value input for the highlighted function icon. If the touch lifts without contact in a predetermined time, the process continues to step 84 to timeout presentation of the touch function on-screen-display user interface and the process returns to step 70.

From step 82 the process continues to step 86 to determine if a tap is detected. If not, the process continues to step 88 to determine if the press force as detected by the force detection sensor before the lift was greater than a threshold to indicate an input. If the force was not sufficient, the process returns to step 70. If the force is sufficient to indicate an input or if a tap is detected at step 86, the process continues to step 90 to update the on-screen-display user interface by completing the function action, such as for a toggle function or by opening a submenu for the function if additional controls are involved, such as an audio controller for balance, volume and sound quality. In the example embodiment, a toggle command input as a function icon key value proceeds to step 100 to open the discrete interface for the function, such as mute of a speaker or microphone. At step 102 the closest function icon for the palm rest touch position is highlighted and at step 104 a determination is made of whether the finger remains in sliding contact to indicate a selection in progress. Once the finger is lifted, the process continues to step 106 to detect the lift time and check the force of the press prior to the lift. At step 108 when a tap is detected or if the force was sufficient to indicate and input, the process completes the function initiation and returns to step 70. From step 90, when the touch function row function icon key value is a submenu, such as a sliding volume bar, the process continues to step 92 to detect a sliding motion on the bar as an input. At step 94 the process reads the sliding bar value as long as the finger stays in contact with the sliding bar and proceeds to step 96 to adjust the sliding bar and input values, such as changing the volume of a speaker. Once the finger lifts from the sliding bar, the process continues to step 98 to time out the on-screen-display user interface once the finger is lifted and continues to step 70 to monitor a next input at the palm rest touch detection surface.

Figure 7:
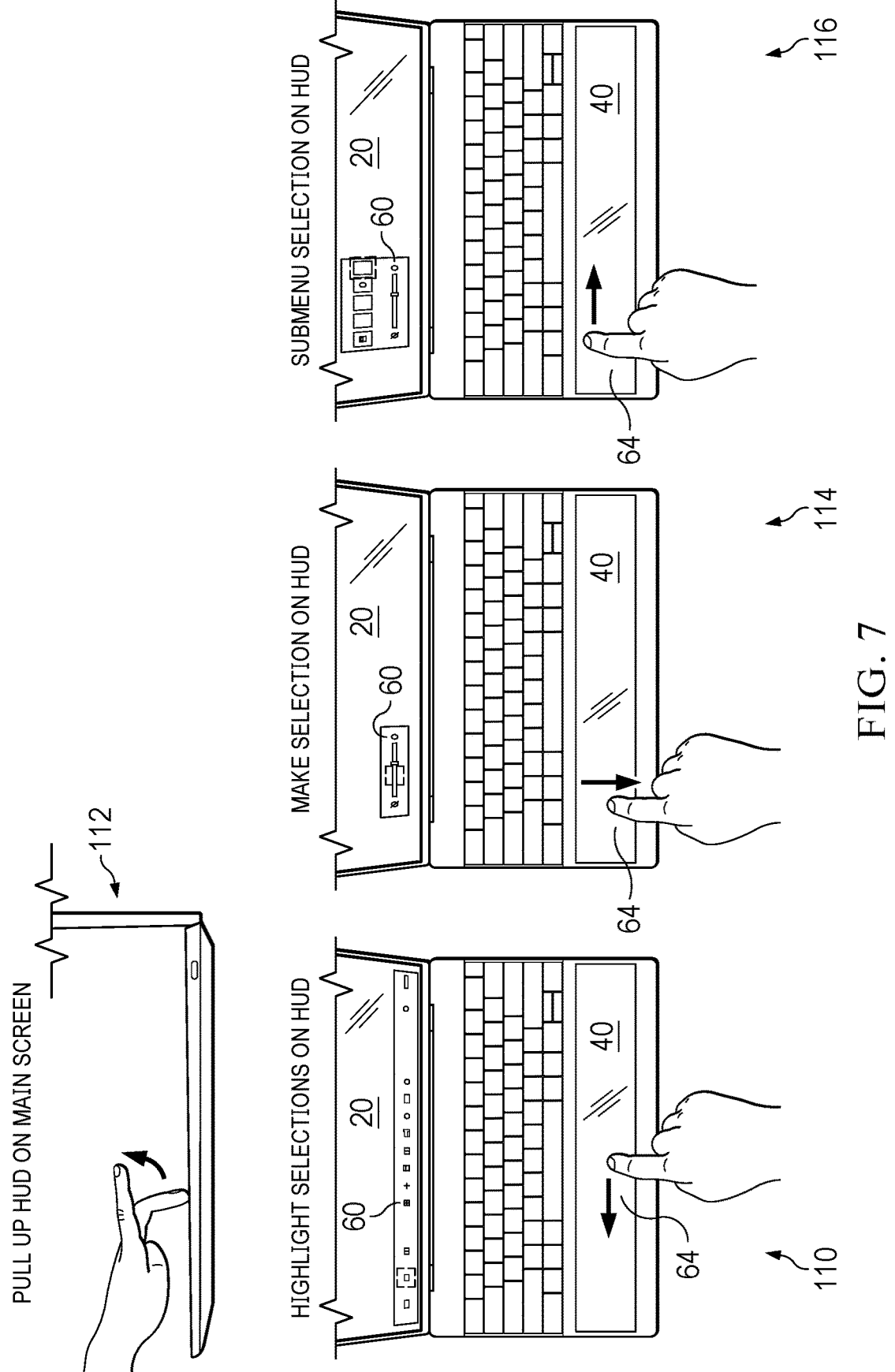
FIG. 7 depicts an alternative embodiment for interactions with a touch function row through gestures, proximity and touch inputs at the touch detect surface of the palm rest.

Referring now to FIG. 7, an alternative embodiment is depicted for interactions with a touch function row through gestures, proximity and touch inputs at the touch detect surface of the palm rest. In the example embodiment, an end user finger flick shown in side view 112 commands the touch function row on-screen-display user interface for presentation as shown in upper view 110. The flick may involve a contact on the palm rest or a proximity input near but not touching the touch detection surface. In one embodiment, the flick proximity and other proximity inputs may use multiple fingers to help distinguish the command input by the end user. Upper view 110 depicts a sliding movement that highlights different icons on the touch function row user interface based on the sliding position. In the upper view 110, the end user slides to highlight to a speaker mute selection that is selected at upper view 114 by a downward slide when the function key icon is highlighted. Upper view 116 depicts the user interface that is presented when a submenu is selected, such as a speaker control submenu. These example inputs are performed with a proximity gesture, although alternative embodiments may use physical touches and a combination of touches and proximity gestures. As is described in greater detail below, gestures that are performed with an end use palm resting on the palm rest may involve input discrimination that compares palm touch area and touch force to aid in differentiation between intentional and unintentional inputs that should be discarded.

Referring now to FIGS. 8A and 8B, a flow diagram depicts a process for detecting touch function row inputs at a palm rest using proximity detection. From start 120 the process continues to step 122 to detect the invocation of the touch function row and touch function on-screen-display user interface, such as with a finger flick and a pointing at a predetermined location. If the flick is not detected at step 122, the process continues to step 124 to perform other touch interactions at the palm rest touch detection surface and returns to start at step 120. Once the flick gesture is detected, the process continues to step 126 to present the touch function on-screen-display user interface and to step 128 to highlight the touch function icon that is closest to the touch location of the gesture. At step 130, when movement of the hover position is detected, the process returns to step 128 to highlight the closest function key icon. When proximity detection indicates the finger is removed, the process continues to step 132 to time out the user interface and return to step 120. When a tap is detected from the proximity location, the process continues to step 134 to determine the touch location and then to step 136 to determine if the tap force is sufficient to indicate an input as opposed to the finger resting on the touch detection surface. If the force of the tap is insufficient to trigger an input, the process returns to step 128. If the force is sufficient to indicate an input, the process continues to step 138 to update the touch function on-screen-display user interface with the selected action and to perform the selected action.

At step 138, the process continues to step 148 when the selected action is a discrete interface, such as a mute icon for a speaker or microphone. At step 150 a determination is made of where the pointed finger hovers over the touch function menu icons and at step 152 the icon closest to the hover finger point is highlighted. The process monitors for a finger hover at step 154 until the finger hover ends, such as by a tap or removal of the finger from the proximity position. When a tap is detected at step 156, the function icon input is commanded and the process returns to step 120. At step 138, when a function having a submenu is commanded, the process continues to step 140 to present the submenu user interface, such as a slider bar to adjust speaker volume. At step 142, the finger hover or touch position is monitored to track a sliding position input to the submenu. When the finger proximity leaves or the sliding contact ends, the process continues to step 146 to start a countdown that completes the action and times out the user interface. While touch or proximity is detected at the palm rest with the sliding bar presented, the process continues to step 144 to adjust the slider bar based upon the sliding position until the proximity or touch is lost. The process then completes the function input value at step 146 and returns to step 120.

A difficulty with interacting by proximity at a palm rest is that an end user might rest the palm down on the touch detection surface, which can interfere with the touch detection for the proximity sensing and the force detection when an input at the palm rest is made with a tap or a press. As an example, an end user may desire to flow between proximity sensing interactions and touch interactions at the palm rest touch detection surface so that taps and presses for inputs can become confused with touch function row menu and submenu navigation. Conventional palm rejection tends to rely on just object size at a touch detection surface to reject palm touches as unintended inputs, however, relying only on touch area can introduce errors, especially when the entire palm rest has a touch detection surface. For example, with a palm resting on the palm rest, an end user does not intend the palm as a touch input but might desire to tap or press with a thumb to click as opposed to a finger. The ability to distinguish the thumb as an intended press depends upon tuning of the touch detection rejection based on size. If palm rejection based on touch area is conservatively tuned so that larger areas can trigger a click input, then a thumb will generally be allowed to perform the input, however, with such touch rejection tuning a light touch of a palm can result in an interpretation as an intentional thumb input. In contrast, aggressive tuning of palm rejection based upon touched area can result in intentional thumb click inputs as being rejected so that thumb clicks will not work. In order to provide more accurate filtering of touches as intentional inputs or unintentional touches, palm rejection uses both the touch area and the touch force to determine if a touch is a palm resting on the touch detection surface. For example, a larger touch area that is less than that expected for a full palm touch area is compared against an expected force so that a light palm rest touch is identified as an unintended input and rejected as a palm touch. Other considerations may also be applied, such as a palm location when the palm touch area and touch force indicate a palm placement being applied to determine a thumb location and a finger location. Thus, in a scenario where an end user lightly places a palm on the touch detection surface as indicated by touch area and force, touch and proximity inputs for finger proximity menu surfing and thumb input taps may be accepted with a higher confidence based upon the expected locations of the thumb and finger. Further, when an end user identity is known, a palm area and pressure of the user may be stored locally so that incidental touches are better sorted from intended inputs with higher confidence based upon expected touch areas and pressures for the user in various contexts.

Figure 9A:
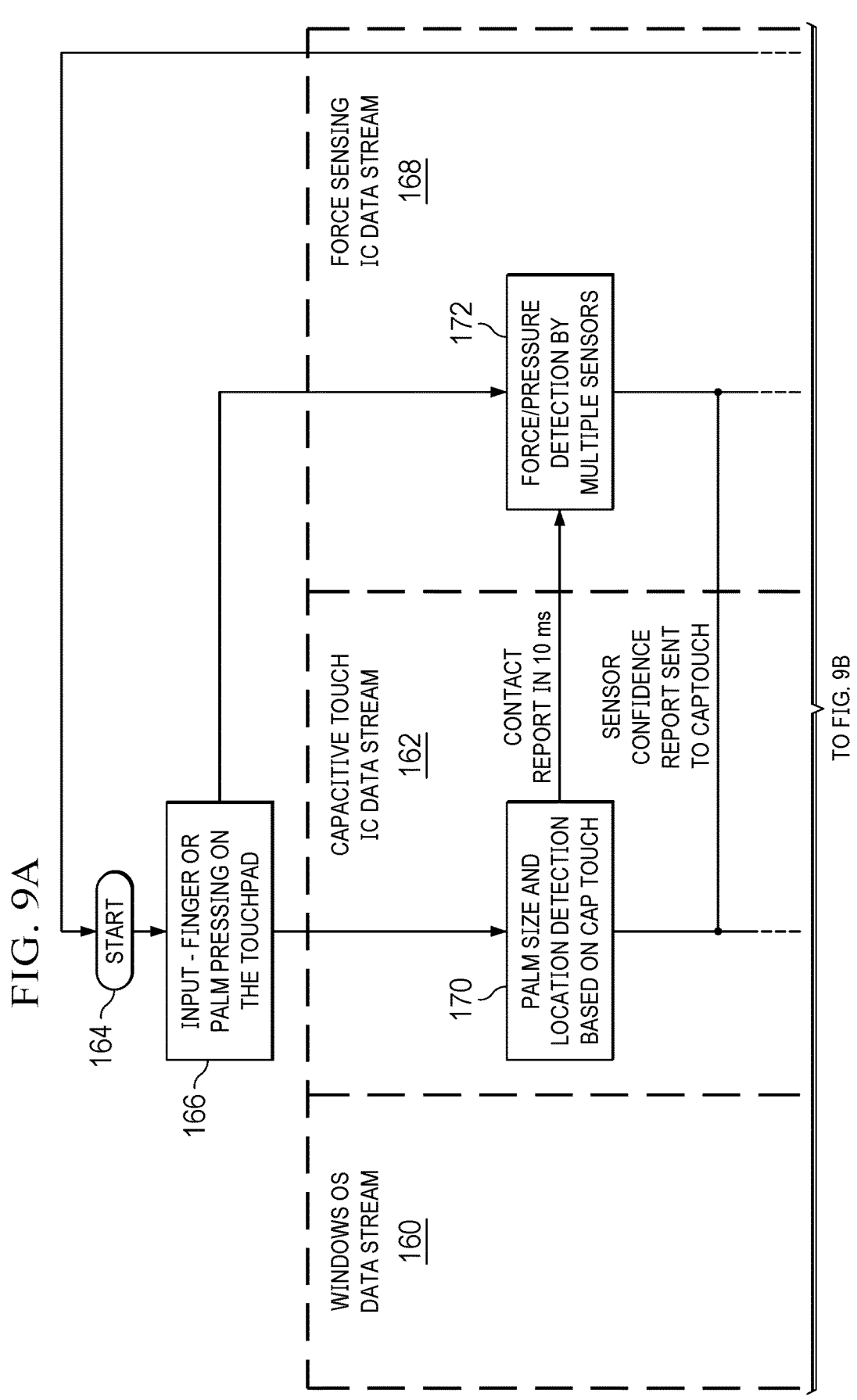
FIGS. 9A and 9B depict a flow diagram of a process for palm rejection at a palm rest touch detection surface by comparing touch area and touch force.
Figure 9B:
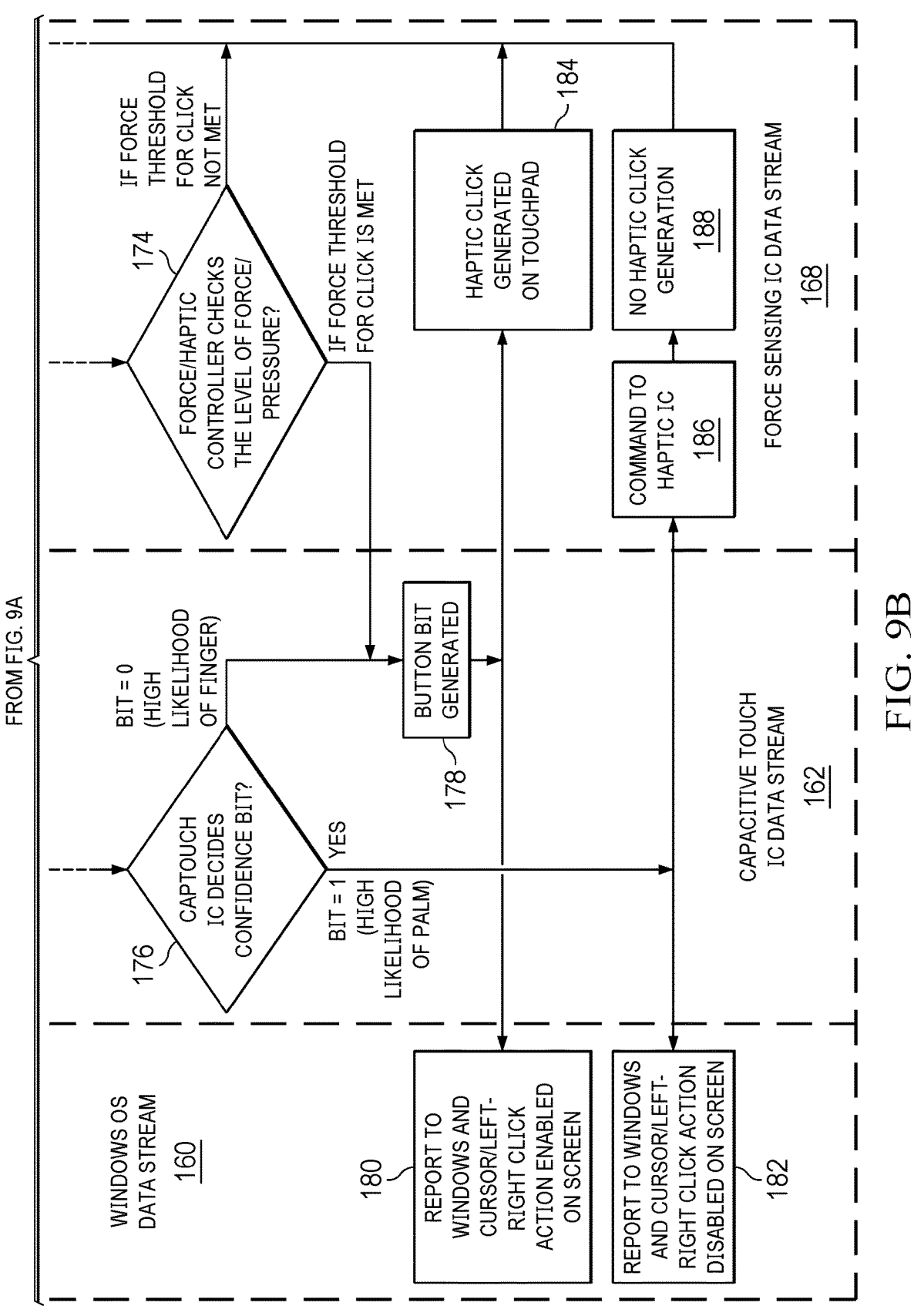

Referring now to FIGS. 9A and 9B, a flow diagram depicts a process for palm rejection at a palm rest touch detection surface by comparing touch area and touch force. Using both the touch area and the detected force of a touch to determine an end user's intention with regards to a touch increases the confidence that a detected touch is properly handled in a rapid manner. The process starts at step 164 and at step 166 an input is detected at the touch detection surface, such as a finger or palm resting on the touch surface. Processing resources at the palm rest interface with an operating system data stream 160, such as WINDOWS, to receive system context and report inputs. At the touch detection surface a touch detection processing resource generates a capacitive touch integrated circuit data stream 162. At the force detection sensor a force detection processing resource generates a force detection sensor integrated circuit data stream 168. The raw data from touch detection and force detection includes all sensed inputs and needs filtering to report usable touch and force data. At step 170, a comparison of the touch area with that expected in the event of a palm touch is performed to identify touches having a palm size and location. At step 176 the touch detection processing resource determines within a confidence level whether the detected palm area and location is a palm touch that is rejected or an intended end user input. A high value of bit 1 is assigned when the touch area on its own indicates a palm touch so that the touch is rejected as an input. A low value of bit 0 is assigned when the touch area on its own indicates a finger touch and the process continues to step 178 to generate a button bit for an input value to report to the operating system.

From step 166 when a touch input or pressure is detected, at step 172 the force detection sensor processing resource determines the force of the touch with force detection sensors located in the touch area. The touch area is provided from the touch detection sensor processing resource to the force detection sensor processing resource. At step 174, the force detection sensor processing resource applies both the force detection and the touch area detection to determine if the level of the force applied at the touch detection surface indicates a click input. If the force does not indicate a click input, the process returns to step 164. If the force is sufficient to indicate a click input, the process continues to step 178 to indicate that the detected touch is a button bit intended by the end user as an input. At step 174, the force detection sensor processing resource determines if a press is an input or is rejected by applying the touch sensor confidence report generated by the touch detection processing resource at step 170 so that the button input versus rejection determination results from both an area and force comparison with that expected by intended versus unintended inputs, such as a palm touch area and pressure. At step 178 a button bit is generated indicating an input and the process continues to step 180 to report the input and to step 184 to generate a haptic feedback. When at step 176 the touch area does not provide an input, the process continues to step 182 to report to the operating system that the click operations are disabled due to the presence of the palm and at steps 186 and 188 no haptic feedback is provided. The process then returns to step 164 to continue monitoring for palm touches.

Figure 10:
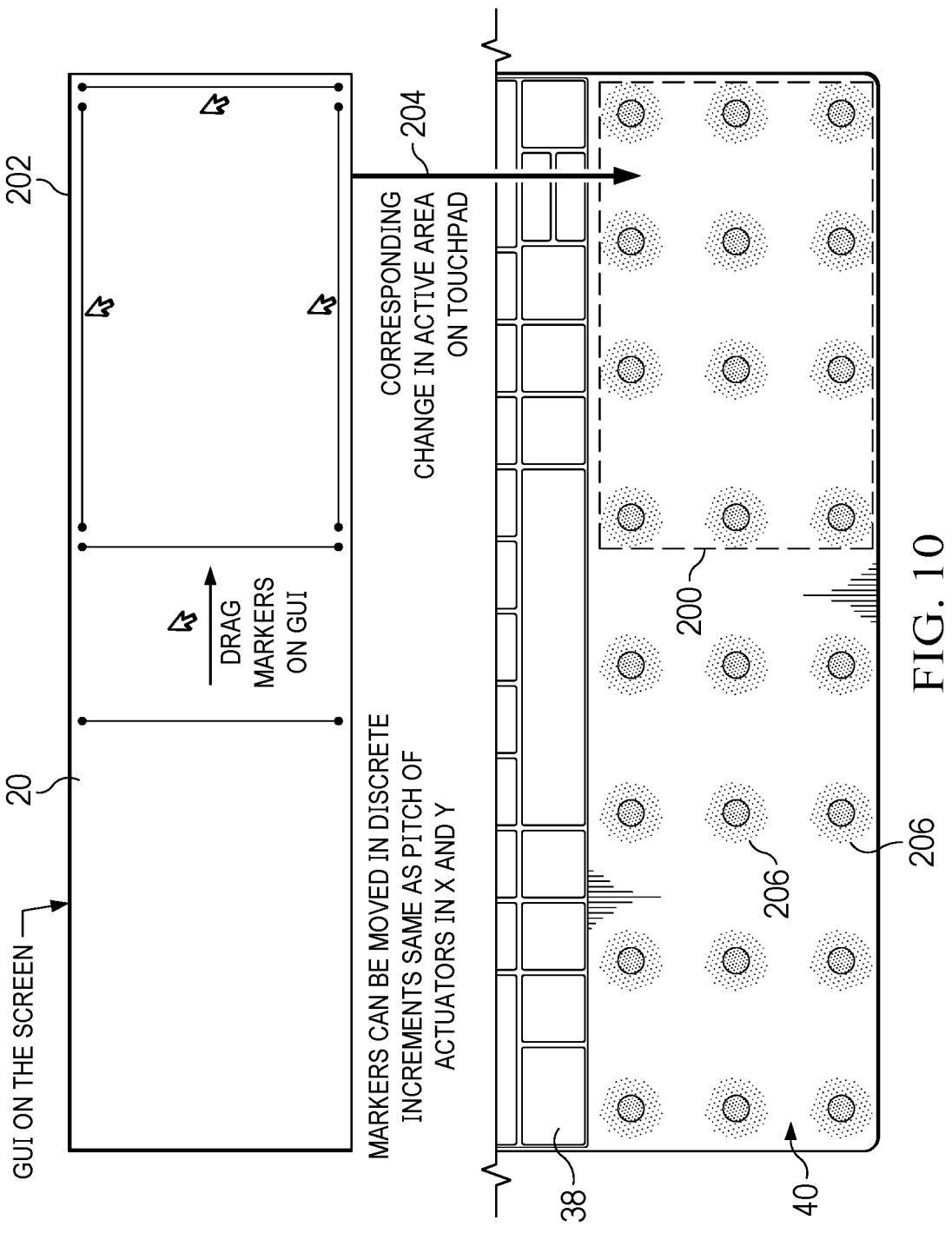
FIG. 10 depicts an upper view of the palm rest force detection surface having the full palm rest area presenting an example of dynamically changing the active area of a palm rest touch detection surface in which touch inputs are accepted.

Referring now to FIG. 10, an upper view of the palm rest 40 force detection surface having a full palm rest touch detection surface presents an example of dynamically changing the active area of a palm rest touch detection surface in which touch inputs are accepted. Managing the size of the palm rest that accepts touch inputs allows an end user to focus tasks and improve the reliability of touch inputs while reducing unintended touch inputs. During configuration of the active area, display 20 presents a visual image of the palm rest with an outline 202 to show which parts are active. An end user manipulates outline 202 by changing the size of the outline in the user interface, such as with a mouse click and drag. In one example embodiment, markers that define the shape of outline 202 are moved in discrete increments, such as the pitch haptic devices 206 included in the force detection sensor of palm rest 40. As the end user adjusts outline 202, the active area is adjust at 204 as indicated by lines 200 may be highlighted with a haptic feedback by the haptic devices 206 at the outline border. Similarly, during use of the touch detection surface, haptic bumps may be applied at the boundary of the active area as a reminder to the end user of the dimension of the active area. In addition, the active area may be shown with an underlining display outline. The example embodiment depicts a single active area on one side, however, in alternative embodiments multiple active areas may be used. For instance, an end user may place palms on the palm rest and then command the area touched by the palms to be inactive, thereby reducing the risk of inadvertent inputs being recorded. Based upon the active area size, the position of a right click region and of the touch function row may automatically configure from a scaling ratio, such as a right click zone that is always 50% of X active area and 25% of Y active area; the touch function row may always be assigned to a 15 mm region along a top edge of the active area; and the scale of cursor movement may remain the same independent of size.

Figure 11:
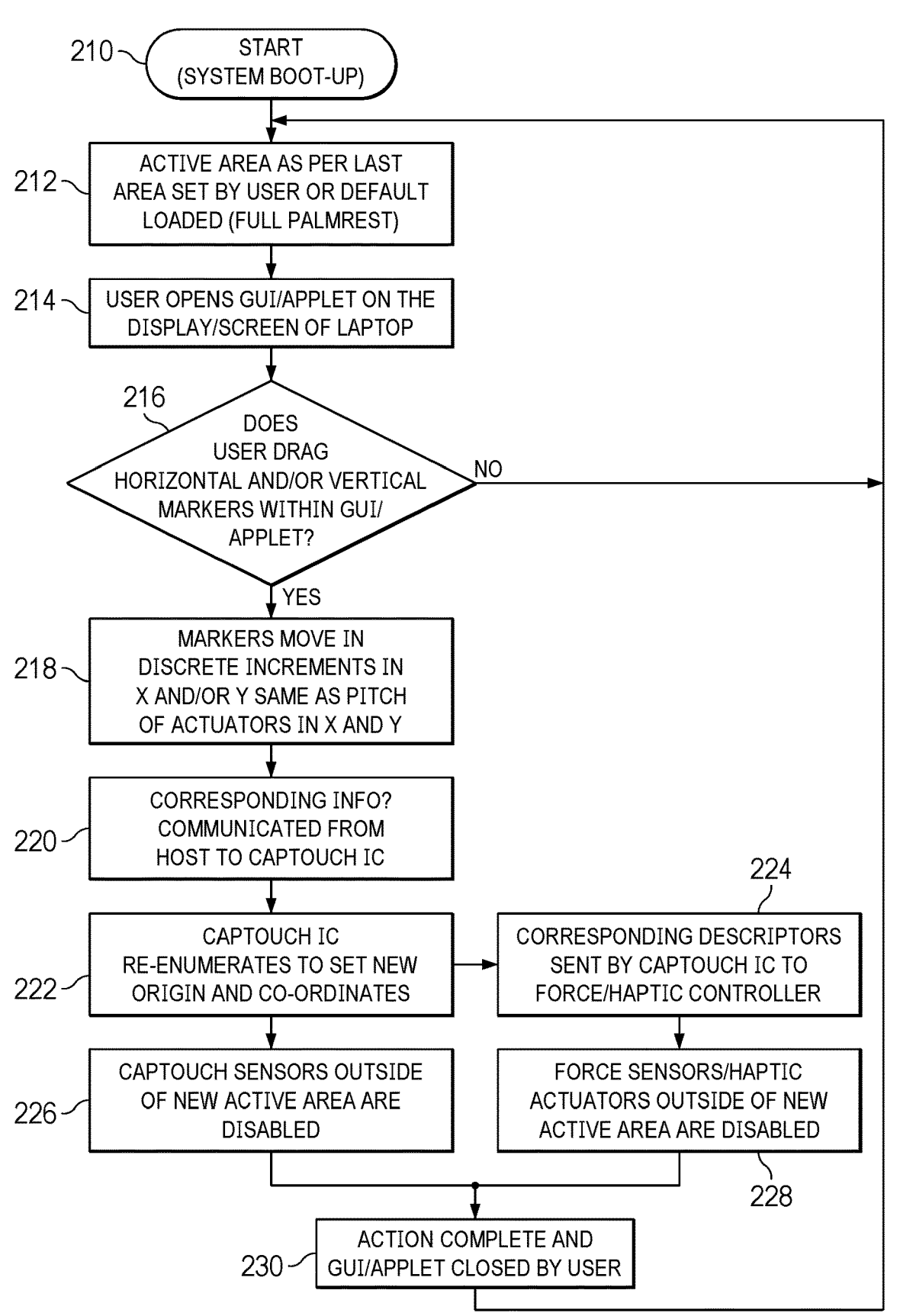
FIG. 11 depicts a flow diagram of an example of a process for defining an active area and inactive area in a palm rest touch detection surface.

Referring now to FIG. 11, a flow diagram depicts an example of a process for defining an active area and inactive area in a palm rest touch detection surface. The process starts at step 210 with system power up and at step 212 sets the active area as per the last set up by a user or per the default setting of the full palm rest if no previous setting is stored. At step 214, the end user opens a user interface on the system display to adjust the active area. In an alternative embodiment having a display included in the palm rest, the user interface may be presented on the palm rest. At step 216, a determination is made of whether the user has dragged the boundary of the active area at the user interface. If not, the process returns to step 212 to continue monitoring for movement. When movement of the boundary is detected at step 216, the process continues to step 218 to move the active area boundary in discrete increments of X and Y coordinates based upon the pitch of the haptic devices. At step 220, the configuration information once completed at the display is communicated to the palm rest touch detection surface processing resource. At step 222 the processing resource renumerates the touch detection surface active area to set a new origin and coordinates. At step 224 the new coordinates are sent to the force detection sensor processing resource and haptic device controller so that all sensing and haptic feedback processing resources share the active area boundary. At step 228 the force detection sensor and haptic devices outside of the active area are disabled. At step 226 the capacitive touch sensor is disabled outside of the active area. At step 230, once the active area is set in the palm rest processing resources, a message is sent to the host to close the user interface.

Figure 12:
FIG. 12 depicts an upper perspective view of a palm rest and keyboard coupled to a housing cover portion with an alternative embodiment of a display integrated in the palm rest.

Referring now to FIG. 12, an upper perspective view depicts a palm rest 40 and keyboard 38 coupled to a housing cover portion 36 with an alternative embodiment of a display 240 integrated in the palm rest. In the example embodiment, display 240 is an E-ink display that presents visual images in a portion of the palm rest 40. A central area of palm rest 40 has a touchpad outline so that an end user can interact with the touch detection surface in a conventional touchpad configuration that readily converts to have a full area of the touchpad, including display 240, usable as a touch detection surface. In an alternative embodiment, a second E-ink display may be included on the other side of the touchpad. Visual images presented at display 240 may be managed under the control of the GPU or an MCU processing resource local to the palm rest. One example use case for display 240 is to support note taking with an end user handwriting directly on the display or at other parts of the palm rest touch detection surface. Display 240 offers a convenient workspace that can act as a small whiteboard to doodle or sketch creative ideas while the rest of the host system is engaged in other tasks, such as videoconferencing. When shared with host processing capabilities, display 240 can support communication functions, such as texts and messages, independent of other system operations. When handwritten notes are taken at display 240, optical character recognition can translate the notes to a digital format. The E-ink display essentially disappears when powered down to provide minimal impact on system aesthetics.

Figure 13A:
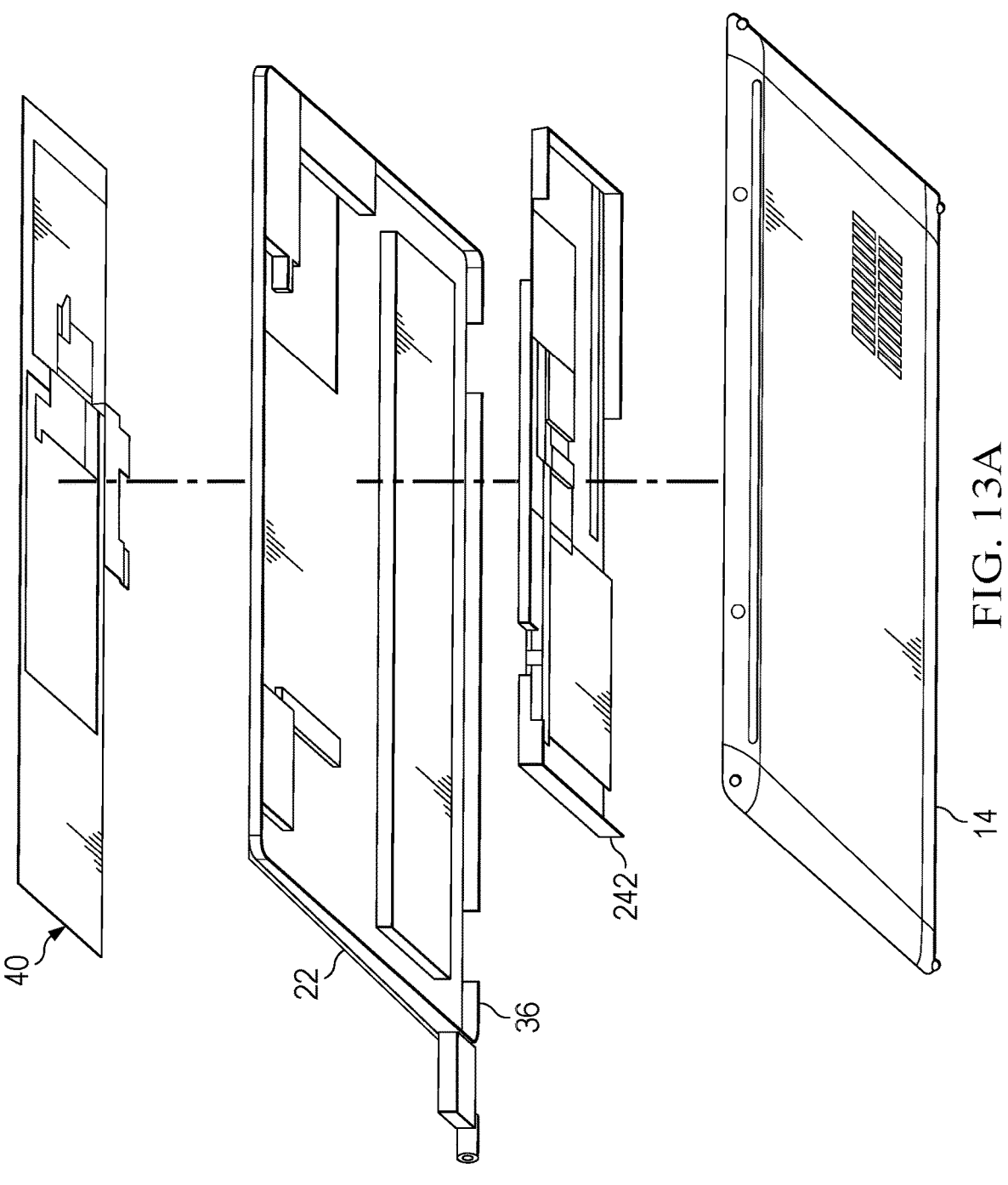
FIGS. 13A and 13B depict an exploded perspective view of a portable information handling system having a display integrated in the palm rest.
Figure 13B:
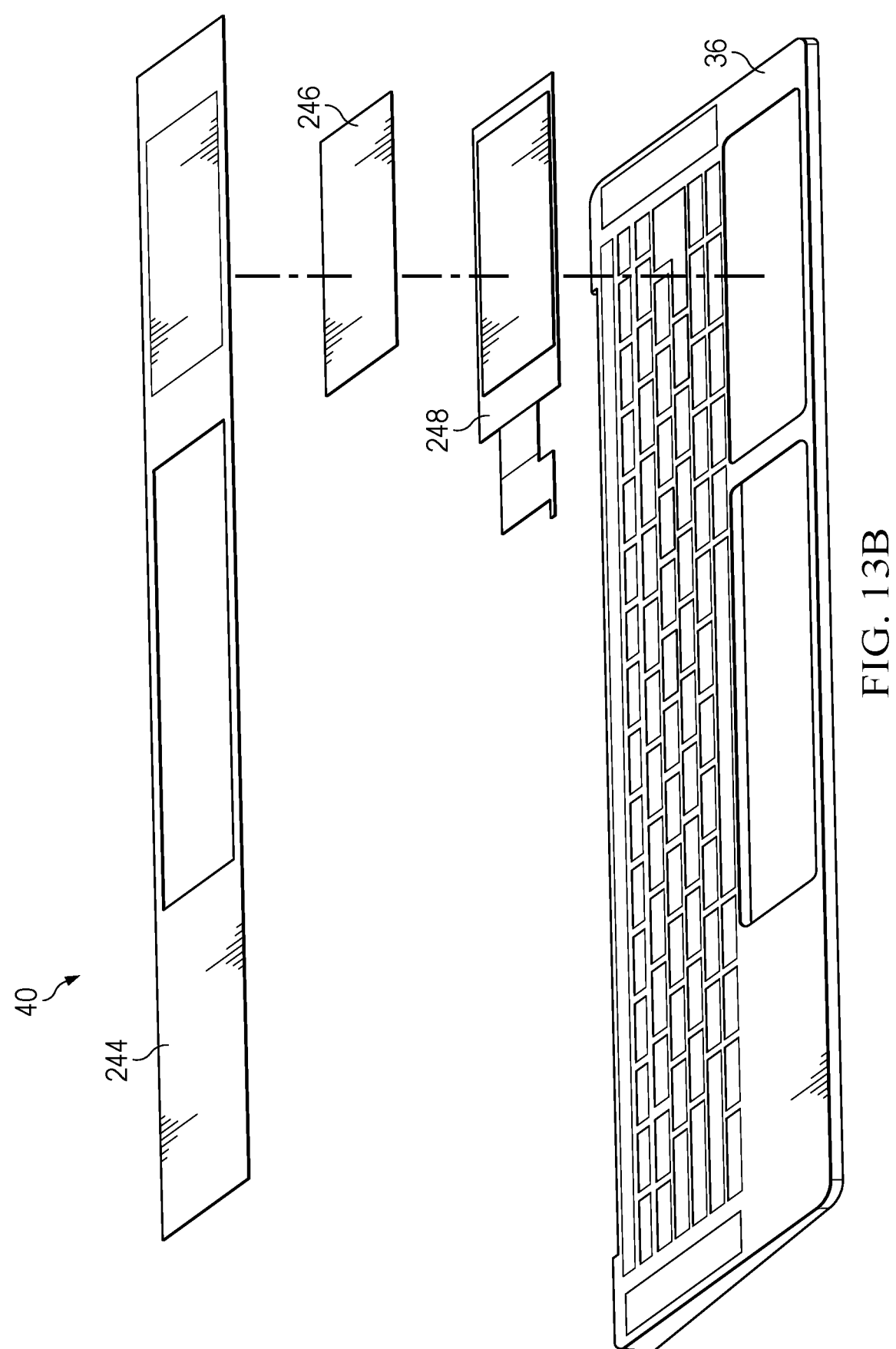

Referring now to FIGS. 13A and 13B, an exploded perspective view depicts a portable information handling system having a display integrated in the palm rest. A housing main portion 14 couples a motherboard 22 in place at a rear side by a hinge and a carrier 242 couples batteries and PCB to support processing functions in a front side opposite the hinge. Palm rest 40 couples to carrier 242 and includes an assembly with a display and touch detection surface. The exploded view of housing cover portion 36 depicts an E-ink display 248 coupled in an open region of cover portion 36 and including a touch detection surface 246. A palm rest cover 244 couples over display 248 and touch detection surface 246. In various embodiments, as described above, various portions of the palm rest area may include display and touch detection to support end user interactions.

Figure 14:
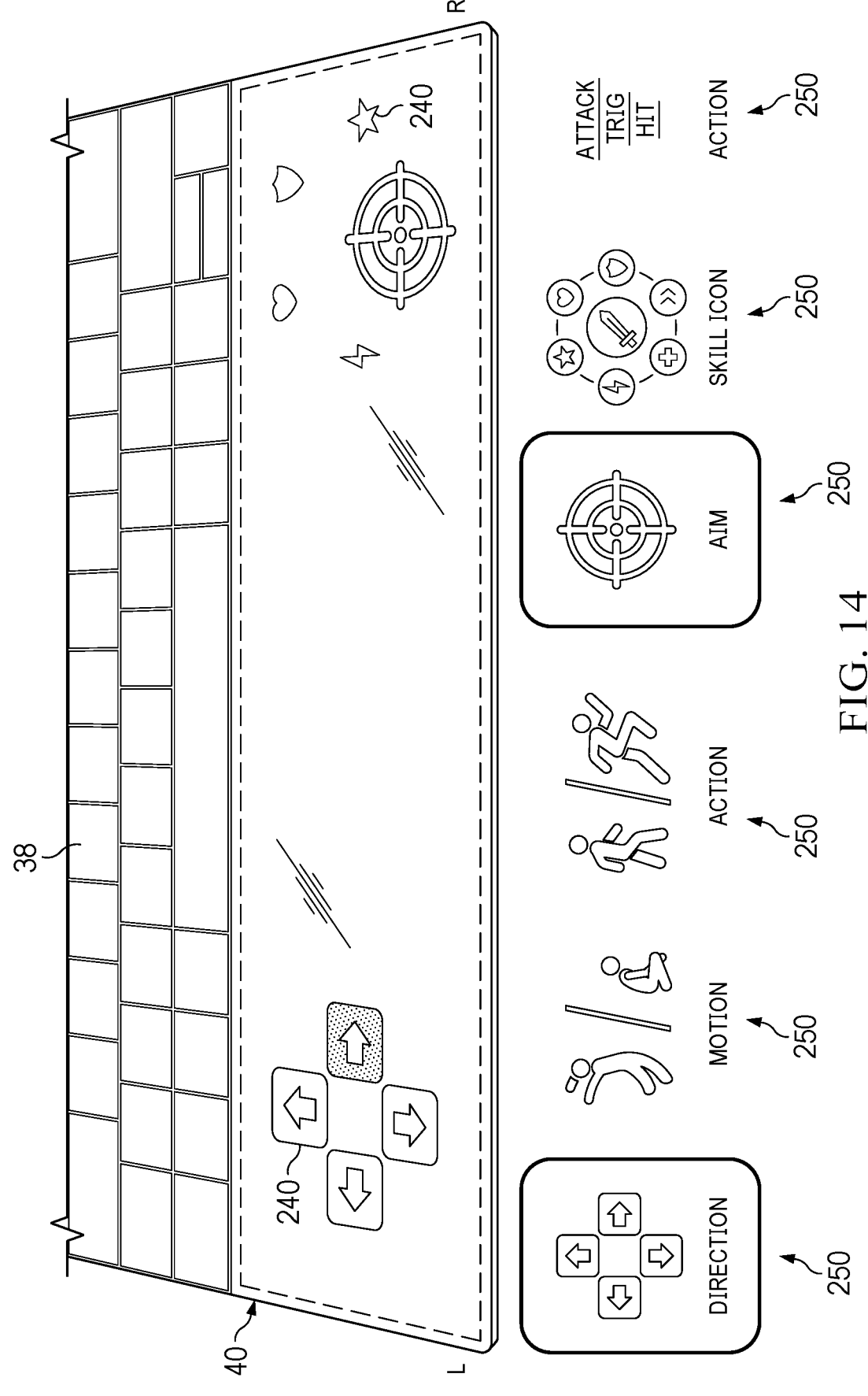
FIG. 14 depicts one example of a palm rest display having gaming interfaces presented to aid in performance of a game application presented at a main display of an information handling system.

Referring now to FIG. 14, one example of a palm rest display is depicted having gaming interfaces presented to aid in performance of a game application presented at a main display of an information handling system. In the example embodiment, separate E-ink displays 240 are included in palm rest 40 with each including touch detection. Alternatively, a single display may be included in palm rest 40 that has two separate viewing and touch input areas. Other types of displays may be used, such as OLED, LCD and light guides that form letters and shapes. As a game progresses and is presented on the system main display, interactive game interfaces 250 are presented based upon the game context. In the example embodiment, a direction interface and an aim interface are in use. The direction interface accepts presses on arrows to propel a game icon on the main display. The aim interface accepts finger slides to change an aim on a weapon. The other interfaces command game icon motions, such as running and jumping, or select skills, such as cycling through available weapons. At a display, the interface may be selected by a flicking gesture or other similar interaction, or may simply appear based upon context in the game.

Figure 15:
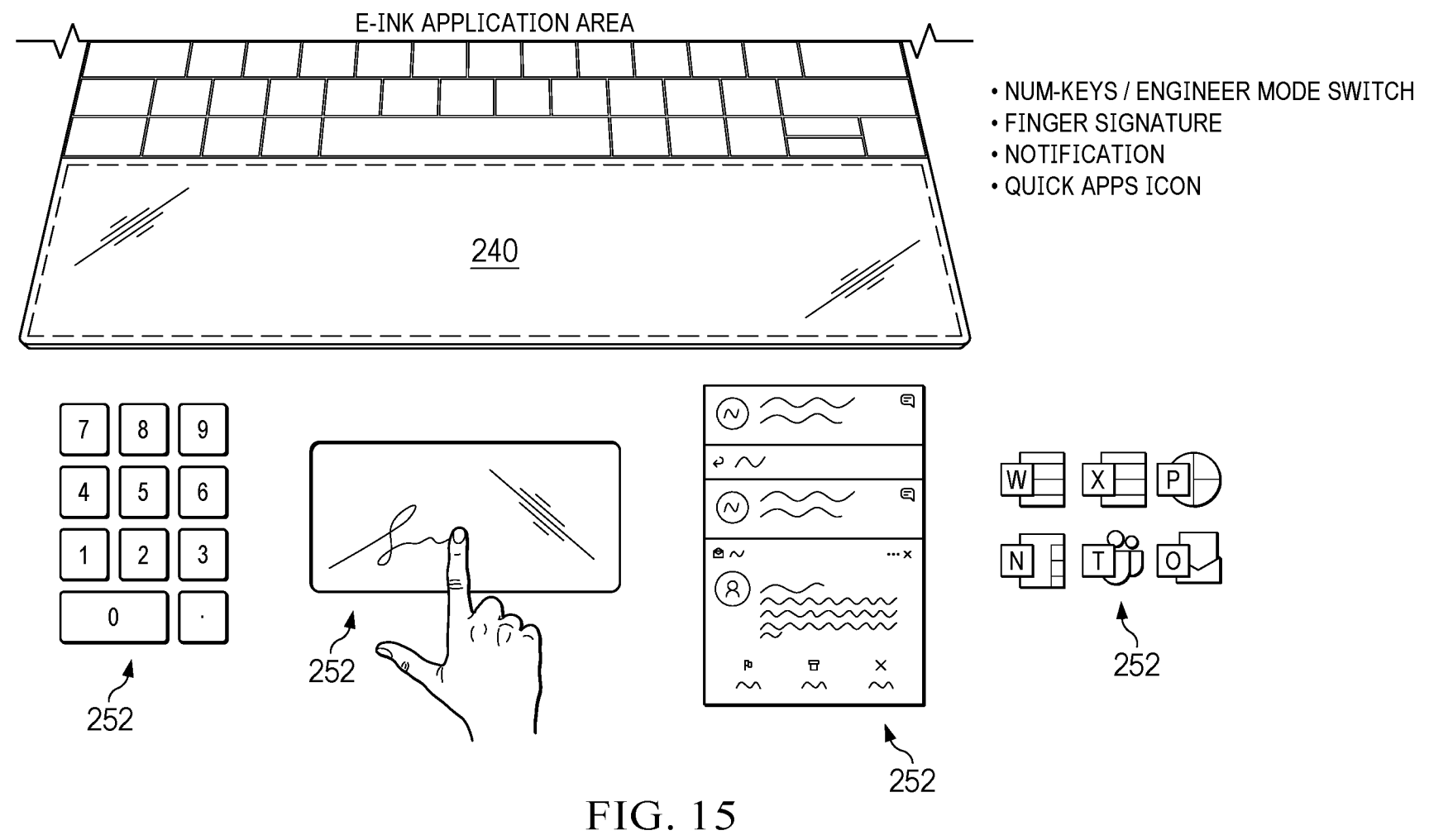

Referring now to FIG. 15, another example of a palm rest display is depicted having utilities that support end user productivity applications. In the example embodiment, a display 240 is included under the palm rest to present visual images and accept touch and force inputs. The example utility interfaces 252 include a number pad, and signature block, a message window to support notifications, text and similar messages, and a launch window having application icons to launch the applications for execution on the main processor. In various embodiments, interfaces at palm rest display 240 may be configurable by an end user.

Figure 16:
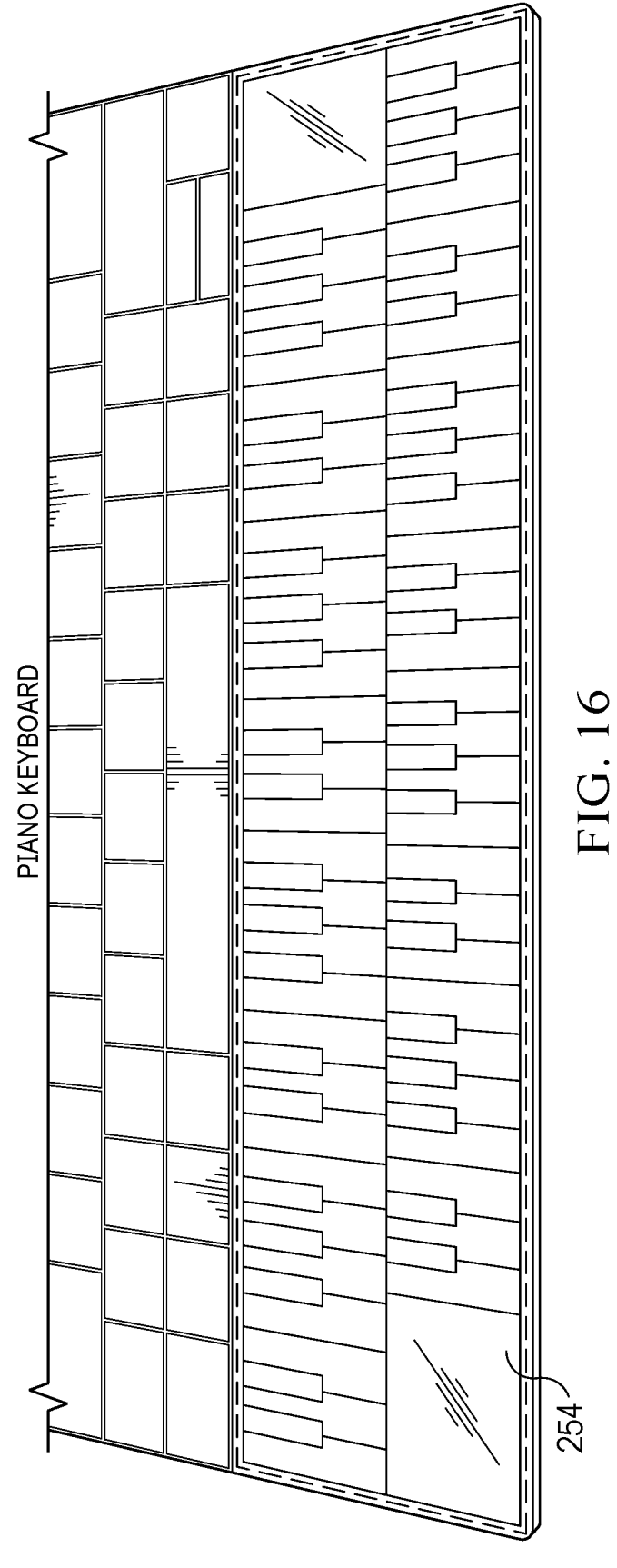
FIG. 16 depicts another example of a palm rest display supporting a music keyboard interface.

Referring now to FIG. 16, another example of a palm rest display is depicted supporting a music keyboard interface 254. In the example embodiment the keyboard interface has all of the keys of the piano presented in upper and lower rows at the palm rest display with inputs accepted as touches at keys of the keyboard. In alternative embodiments other types of music interfaces may be presented. In one example embodiment, the keys are presented in a single row that slides left and right. During inputs to the music keyboard keys, palm rest and other types of unintentional inputs may be rejected by comparing touch areas and touch forces, as described above in greater detail.

Figure 17:
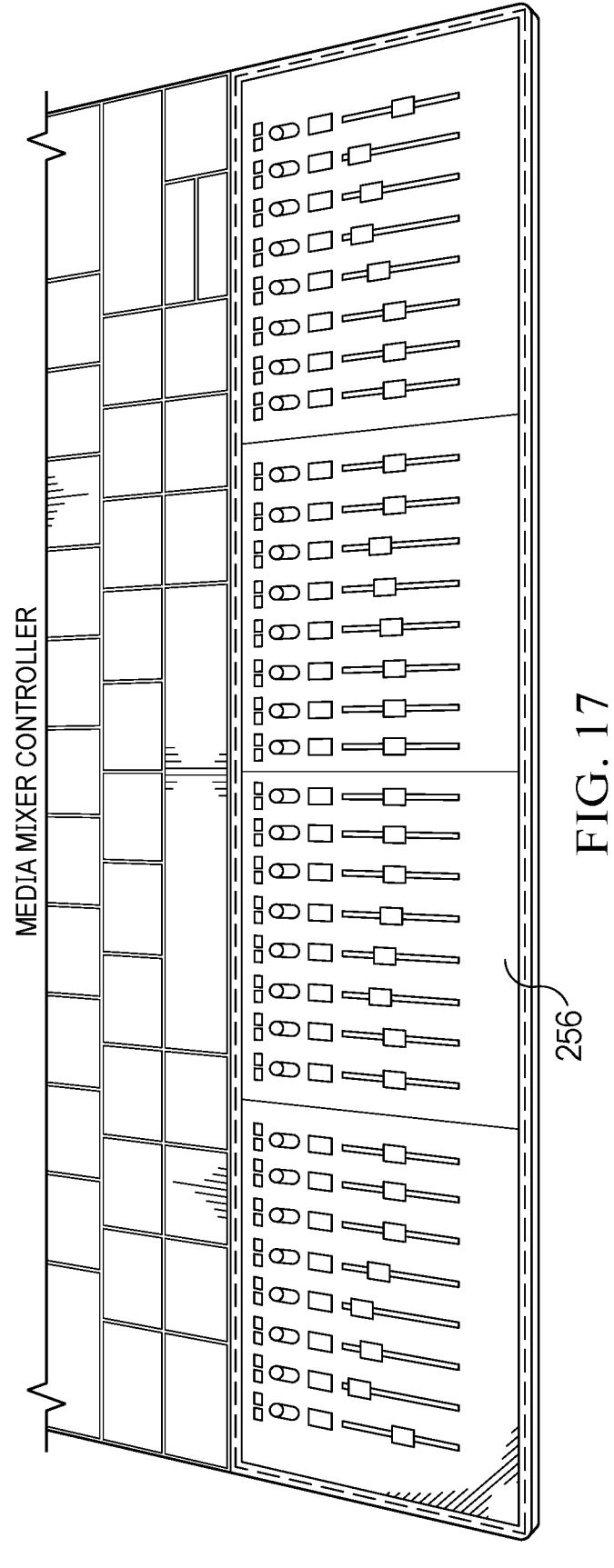
FIG. 17 depicts another example of a palm rest display supporting a music mixing interface.

Referring now to FIG. 17, another example of a palm rest display is depicted supporting a music mixing interface 256. As with the music keyboard, an end user mixes sounds by pressing buttons and sliding switches. The entire mixing interface is presented on the palm rest display, however, more precise control of the mixing may be performed by tapping on a section of the user interface to expand that section.

Figure 18:
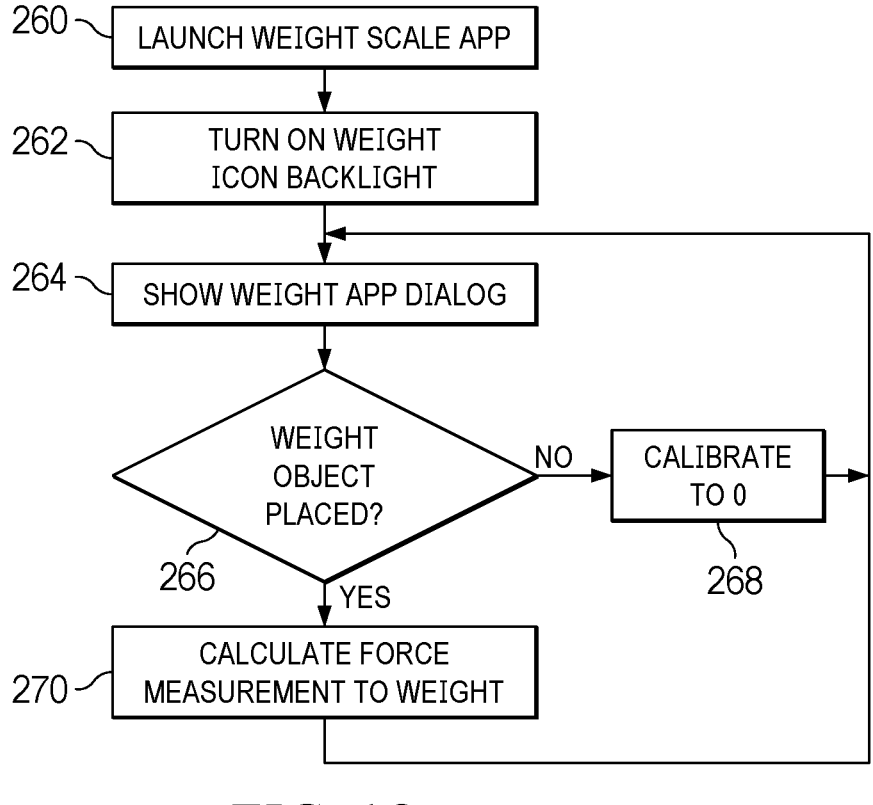
FIG. 18 depicts a flow diagram of a process for measuring an object's weight at a palm rest having a force detection sensor.

Referring now to FIG. 18, a flow diagram depicts a process for measuring an object's weight at a palm rest having a force detection sensor. A location on the palm rest is selected by an end user, such as with a tap and a highlight at the palm rest display. Once the location is selected, the end user places an item to be weighed on the location so that the force sensor can measure the items weight. As an example, a postage application opens a weight application of the palm rest to determine a postage for an envelope placed on the weighing location. The process starts at step 260 by launching the weight scale application at the palm rest processing resource. At step 262 an icon is presented on the palm rest for the weight application with a backlight and/or E-ink presentation. At step 264, a weight application dialog is presented to guide an end user in weighing an object, such as at the palm rest display or the main system display. At the initial opening of the weight application, a zeroing of the scale may take place. At step 266, a determination is made of whether an object to be weighed of whether an object is placed on the weight area. If not, the process continues to step 268 to calibrate the scale to zero. When an object is placed on the weight area, the process continues to step 270 to calculate the force measurement of the object and present the weight at the display.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing and operable to process information;
a memory disposed in the housing and interfaced with the processor, the memory operable to store the information;
a display interfaced with the processor and operable to present the information as visual images;
a keyboard coupled to the housing, the keyboard having plural mechanical keys to accept end user inputs;
a palm rest coupled to the housing adjacent the keyboard and distal the display, the palm rest having a capacitive touch detection surface interfaced with the processor, the capacitive touch surface operable to detect touches as inputs;
a touch function row coupled to the housing between the keyboard and the display and operable to accept touch function inputs by touches at the touch function row; and
a non-transient memory storing instructions that when executed cause detection of touch locations in a predetermined touch function row portion of the palm rest and in response presentation at the display of a function on-screen-display user interface having plural function key value icons selected from plural functions of the touch function row, one of the function key value icons highlighted based upon the detected touch location in the touch function row portion of the palm rest, the instructions further causing detection of touch function row inputs by touches at either of the touch function row or the touch function row portion of the palm rest.

2. The information handling system of claim 1 wherein the functions include at least key input values of F1-F9.

3. The information handling system of claim 2 further comprising:
a secondary display included under the palm rest; and
instructions that cause the presentation of function key value icons in the touch locations of the predetermined touch function row portion.

4. The information handling system of claim 2 further comprising instructions that cause:
detection of a lift of a touch from the touch location followed by a tap in a predetermined time period; and
in response to the tap, command of the function associated with the touch location detected at the lift.

5. The information handling system of claim 2 further comprising:
a force detection sensor disposed at the palm rest capacitive touch detection surface and interfaced with the processor, the force detection sensor operable to detect pressures applied by the touches; and
instructions that cause in response to the pressures command of the function associated with the touch location.

6. The information handling system of claim 5 further comprising instructions that compare an area size of a detected touch with a pressure of the detected touch to determine whether the touch is intended as an input.

7. The information handling system of claim 6 wherein the detected touch is a palm touch at the touch detection surface.

8. The information handling system of claim 2 further comprising instructions that cause:
detection of a finger in proximity to the touch detect surface to determine the touch location followed by a tap; and
in response to the tap, command of the function associated with the touch location detected with the proximity.

9. The information handling system of claim 2 wherein the keyboard has a capacitive touch surface in the place of the keyboard function row of keys.

10. A method for managing touch inputs at an information handling system, the method comprising:
coupling a touch detection surface to a palm rest adjacent a lower side of a mechanical keyboard of the information handling system;
defining a touch function row portion having plural touch locations at the touch detection surface of the palm rest;
coupling a touch function row adjacent an upper side of the mechanical keyboard between the keyboard and a display;
detecting touches as inputs at the touch function row;
detecting touch locations at the touch function row portion; and
in response to a touch detected at the touch function row portion touch locations, presenting at a main display of the information handling system a function on-screen-display user interface having plural function icons, one of the function icons highlighted based upon the detected touch location, inputs to the function on-screen-display user interface accepted at either the touch function row or the touch function row portion.

11. The method of claim 10 wherein the functions include at least key input values F1-F9.

12. The method of claim 10 further comprising:
detecting touches with the touch detection surface;
detecting force associated with the touches with a force detection sensor; and
discarding at least some of the touches as unintended inputs by comparing the area of the touches and the force of the touches.

13. The method of claim 12 further comprising:
comparing the touches with an area of a palm;
comparing the touches with force of the palm resting on the touch detection surface; and

discarding the touches when the touches have the area and the force of the palm.

14. The method of claim 10 further comprising:

detecting a lift of the touch followed by a tap; and in response to the tap, inputting the function associated with the highlighted function icon.

15. The method of claim 14 further comprising:

coupling a secondary display to the palm rest; and detecting the touches and detecting forces through the secondary display.

16. The method of claim 15 further comprising presenting the touch function row plural function icons at the secondary display.

17. A palm rest configured to couple to an information handling system adjacent a keyboard, the palm rest comprising:

a processing resource operable to execute instructions;

a touch detection surface operable to detect end user touches adjacent a lower side of a keyboard, the keyboard accepting inputs with a mechanical depression of keys;

a touch function row operable to detect touch function inputs adjacent an upper side of the keyboard between the keyboard and a display; and a non-transient memory storing instructions that when executed on the processing resource cause detection of touch locations in a predetermined touch function row portion of the touch detection surface and in response to present at a main display a function on-screen-display user interface having plural function key value icons selected from plural functions, one of the function icons highlighted based upon the detected touch location, either of the touch function row or the touch function row portion accepting touch inputs to select the plural function key value icons.

18. The palm rest of claim 17 further comprising:

a force detection sensor disposed at the touch detection surface and interfaced with the processing resource, the force detection sensor operable to detect a pressures applied by the touches; and instructions stored in the non-transient memory that when executed on the processing resource cause a comparison of the area of the touches with the pressure of the touches to discard at least some of the touches as unintentional.

19. The palm rest of claim 18 further comprising instructions stored in the non-transient memory that when executed on the processing resource further cause:

identify at least some of the touches as having a shape of an end user palm; and reject the touches having the shape of the end user palm when the forces correspond to a weight of the end user palm relative to the area.

20. The palm rest of claim 17 wherein the plural functions include at least key input values of F1 through F9.

* * * * *